(12) United States Patent
Lu et al.

(10) Patent No.: US 10,841,624 B2
(45) Date of Patent: Nov. 17, 2020

(54) INFORMATION PROCESSING METHOD, TERMINAL, SYSTEM, AND COMPUTER STORAGE MEDIUM

(71) Applicant: TENCENT TECHNOLOGY (SHENZHEN) COMPANY LIMITED, Shenzhen (CN)

(72) Inventors: Liangchao Lu, Shenzhen (CN); Yue Zhang, Shenzhen (CN); Daping Yu, Shenzhen (CN); Xu Song, Shenzhen (CN); Yan Luo, Shenzhen (CN); Jing Zhang, Shenzhen (CN); Xiaokang Ren, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 0 days.

(21) Appl. No.: 16/383,284

(22) Filed: Apr. 12, 2019

(65) Prior Publication Data

US 2019/0238908 A1    Aug. 1, 2019

Related U.S. Application Data

(63) Continuation of application No. PCT/CN2017/118305, filed on Dec. 25, 2017.

(30) Foreign Application Priority Data

Dec. 28, 2016   (CN) .......................... 2016 1 1237147

(51) Int. Cl.
*H04N 7/10* (2006.01)
*H04N 7/025* (2006.01)
(Continued)

(52) U.S. Cl.
CPC ....... *H04N 21/23424* (2013.01); *H04L 29/06* (2013.01); *H04L 29/08* (2013.01);
(Continued)

(58) Field of Classification Search
None
See application file for complete search history.

(56) References Cited

U.S. PATENT DOCUMENTS

| 8,875,175 | B1 * | 10/2014 | McCoy | ............... | H04N 21/812 |
| | | | | | 348/14.02 |
| 2002/0112002 | A1 * | 8/2002 | Abato | ..................... | G06F 9/465 |
| | | | | | 709/203 |

(Continued)

FOREIGN PATENT DOCUMENTS

| CN | 101087388 A | 12/2007 |
| CN | 105635764 A | 6/2016 |

(Continued)

OTHER PUBLICATIONS

The World Intellectual Property Organization (WIPO) International Search Report for PCT/CN2017/118305 dated Mar. 7, 2018 5 Pages (including translation).

(Continued)

*Primary Examiner* — William J Kim
(74) *Attorney, Agent, or Firm* — Anova Law Group, PLLC

(57) ABSTRACT

This application discloses an information processing method, a terminal and a system. The method includes initializing a live broadcasting service between an anchor user and a live viewer; collecting media data; encoding the collected media data to form a live video stream, and sending the live video stream to a live window of the live viewer. The method further includes setting a media information push area based on a live window of the anchor user;

(Continued)

loading, to the media information push area, candidate media information pushed to the live viewer; determining to-be-pushed media information selected by the anchor user; and sending the to-be-pushed media information to the media information push area of the live viewer to be displayed.

20 Claims, 19 Drawing Sheets

(51) Int. Cl.
    *H04N 21/234*     (2011.01)
    *H04L 29/08*     (2006.01)
    *H04N 21/235*     (2011.01)
    *H04L 29/06*     (2006.01)
    *H04N 21/2187*     (2011.01)

(52) U.S. Cl.
    CPC ...... *H04L 65/4061* (2013.01); *H04L 65/4076* (2013.01); *H04L 65/4092* (2013.01); *H04L 65/602* (2013.01); *H04L 67/26* (2013.01); *H04N 21/2187* (2013.01); *H04N 21/235* (2013.01)

(56) References Cited

U.S. PATENT DOCUMENTS

| | | |
|---|---|---|
| 2003/0023973 A1 | 1/2003 | Monson et al. |
| 2007/0204310 A1* | 8/2007 | Hua ............... H04N 21/812 725/88 |
| 2008/0268961 A1* | 10/2008 | Brook ............. H04N 21/4781 463/42 |
| 2008/0288974 A1* | 11/2008 | Dierlam ........... H04N 21/8586 725/32 |
| 2008/0306818 A1* | 12/2008 | Evans ............. G06Q 30/0264 705/14.61 |
| 2008/0307454 A1* | 12/2008 | Ahanger ............. G06Q 30/02 725/36 |
| 2009/0210894 A1* | 8/2009 | Reckless ............. H04N 7/163 725/32 |
| 2009/0228796 A1* | 9/2009 | Eggink ........... H04N 21/25891 715/716 |
| 2011/0145858 A1* | 6/2011 | Philpott ............. H04N 21/6582 725/32 |
| 2011/0246657 A1* | 10/2011 | Glow ................. H04N 21/6547 709/231 |
| 2012/0166289 A1* | 6/2012 | Gadoury ............. H04N 21/6437 705/14.66 |
| 2012/0278497 A1* | 11/2012 | Hsu ................... H04L 65/607 709/231 |
| 2014/0115625 A1* | 4/2014 | McCoy ............. H04N 21/8455 725/34 |
| 2014/0245365 A1* | 8/2014 | Axelrod ............ H04N 21/2665 725/109 |
| 2015/0043892 A1* | 2/2015 | Groman ............. H04N 21/4627 386/278 |
| 2015/0082203 A1* | 3/2015 | James ................. G06F 3/0484 715/756 |
| 2015/0149327 A1* | 5/2015 | Fonarev .............. G06F 3/0482 705/27.1 |
| 2015/0324832 A1* | 11/2015 | Kaufman ............. H04L 67/22 705/14.17 |
| 2016/0277802 A1* | 9/2016 | Bernstein ........... H04N 21/4307 |
| 2016/0286244 A1* | 9/2016 | Chang ............. H04N 21/26603 |
| 2016/0366464 A1* | 12/2016 | Rouady ............. H04N 21/4758 |
| 2016/0381427 A1* | 12/2016 | Taylor ............. H04N 21/23424 725/13 |
| 2018/0034874 A1* | 2/2018 | Cornell ................ G06Q 10/10 |
| 2018/0054659 A1* | 2/2018 | Goswami ............ H04N 21/816 |
| 2018/0124477 A1* | 5/2018 | Qu ..................... H04N 21/2187 |
| 2018/0146223 A1* | 5/2018 | Kedenburg, III ............................ H04N 21/23418 |
| 2019/0281327 A1* | 9/2019 | Li ....................... H04N 21/2187 |

FOREIGN PATENT DOCUMENTS

| | | |
|---|---|---|
| CN | 105704504 A | 6/2016 |
| CN | 105791889 A | 7/2016 |
| CN | 105898446 A | 8/2016 |
| CN | 106162259 A | 11/2016 |

OTHER PUBLICATIONS

The State Intellectual Property Office of the People's Republic of China (SIPO) Office Action 1 for 201611237147.8 dated Nov. 5, 2019 12 Pages (including translation).

* cited by examiner

US 10,841,624 B2

INFORMATION PROCESSING METHOD, TERMINAL, SYSTEM, AND COMPUTER STORAGE MEDIUM

RELATED APPLICATION

This application claims priority to PCT/CN2017/118305, filed on Dec. 25, 2017, which in turn claims priority to Chinese Patent Application No. 201611237147.8, filed on Dec. 28, 2016, and claims priority to the Chinese Patent. The two applications are incorporated by reference in their entirety.

FIELD OF THE TECHNOLOGY

This application relates to a communications technology, and in particular, to an information processing method, a terminal, a system, and a computer storage medium.

BACKGROUND OF THE DISCLOSURE

Providing a live broadcasting service by using a network has become a new form of information dissemination and is widely available. In the live broadcasting service, there is a requirement of pushing media information in forms such as an advertisement and news to a live viewer.

In the live broadcasting service, an anchor user may establish a live studio on a live platform, collect performance of the anchor user in an audio or video form by using an anchor user terminal, and publish the collected audio or video to the live studio. A live viewer accessing the live studio may view the performance of the anchor user, to form a real-time sharing effect between the anchor user and the live viewer. Moreover, media information that needs to be pushed to the live viewer is added in a live window.

It is difficult to effectively fuse the media information and the live broadcasting service. Using an advertisement as an example, the problem is represented in the following aspects.

First, an advertisement is presented manually, or an advertisement is pushed in the live broadcasting service in a manner of encoding a live video stream to add a layer to a video layer of the live video stream. Because re-encoding processing is involved, efficiency is low. When an advertisement is pushed in the live broadcasting service, a plurality of times of encoding the live video stream are also involved, and resource overhead are large.

Secondly, in the related technology, advertisements in the live broadcasting service include a pushed advertisement that comes from advertisements directly delivered by an advertisement system. It is impossible for an anchor user to completely understand all advertisements that need to be pushed. Consequently, in a live broadcasting process, it is difficult to combine an advertisement that needs to be pushed and a live scenario, impairing the advertisement conversion ratio.

SUMMARY

Embodiments of this application provide an information processing method, a terminal, a system, and a computer storage medium, to effectively fuse a live broadcasting service and media information push.

Technical solutions of the embodiments of this application are implemented as follows.

An embodiment of this application provides an information processing method applied to a computing terminal. The method includes initializing, by the computing terminal, a live broadcasting service between an anchor user and a live viewer; collecting media data; encoding the collected media data to form a live video stream, and sending the live video stream to a live window of the live viewer. The method further includes setting, by the computing terminal, a media information push area based on a live window of the anchor user; loading, to the media information push area, candidate media information pushed to the live viewer; determining to-be-pushed media information selected by the anchor user; and sending the to-be-pushed media information to the media information push area of the live viewer to be displayed.

An embodiment of this application provides an information processing method. The method includes initializing a live broadcasting service between a live viewer and an anchor user; and receiving a live video stream sent by the anchor user. The method further includes performing a playback in a live window of the live viewer based on the received live video stream; receiving media information sent by the anchor user; and establishing a media information push area based on the live window of the live viewer, and loading the received media information to the established area to be displayed.

An embodiment of this application provides an information processing system, including: an anchor user terminal, initializing a live broadcasting service between an anchor user and a live viewer with a live viewer terminal; collecting media data on an anchor user side, encoding collected media data to form a live video stream, and sending the live video stream to a live window of the live viewer to perform playback; the anchor user terminal establishing an area based on a live window of the anchor user; loading, to the area, candidate media information pushed to the live viewer, and determining to-be-pushed media information selected by the anchor user; and sending the to-be-pushed media information to the live viewer terminal. The system further includes the live viewer terminal, establishing a media information push area based on the live window of the live viewer, and loading the received media information to the established area to perform presentation.

An embodiment of this application provides a non-transitory storage medium storing computer program instructions. The computer program instructions, when being executable by at least one processor, cause the at least one processor to perform: initializing a live broadcasting service between an anchor user and a live viewer; collecting media data; encoding the collected media data to form a live video stream, and sending the live video stream to a live window of the live viewer. The computer program instructions also cause the at least one processor to perform: setting a media information push area based on a live window of the anchor user; loading, to the media information push area, candidate media information pushed to the live viewer; determining to-be-pushed media information selected by the anchor user; and sending the to-be-pushed media information to the media information push area of the live viewer to be displayed.

In some embodiments of the present disclosure, when media information is pushed to a live viewer in a live broadcasting service, a live video stream and the media information are independently sent to the live viewer. The transmission of the live video stream and transmission of the media information do not affect each other. The live video stream is played in a live window on a live viewer side. The media information is presented in an area established based on the live window. The media information and the live video stream are presented by using different mechanisms, to implement decoupling of the media information and the live video stream in transmission and presentation aspects. As such, when the pushed media information needs to be switched, recoding processing on the live video stream is not involved, thereby saving resource overhead.

Further, by configuring, in the area, a list of media information that can be pushed to the live viewer and that is presented to an anchor user, the anchor user may select acquainted/preferred media information to be pushed to the live viewer in a live process, to fuse content of the live broadcasting service and the media information, so that the pushed media information is accepted by the live viewer easily. As such, advertisement, conversion of an advertisement effect (for example, click, purchase and information retention of the live viewer) can be improved.

BRIEF DESCRIPTION OF THE DRAWINGS

FIG. 8-1 to FIG. 8-12 are a series of optional schematic displaying diagrams of pushing an advertisement in a live broadcasting service according to an embodiment of this application;

FIG. 9 is a schematic diagram of an optional architecture of deployment of a live client and an SDK on a user side and communication with a server according to an embodiment of this application; and FIG. 10-1 to FIG. 10-3 are schematic diagrams of an optional process of pushing an advertisement in a live broadcasting service according to an embodiment of this application.

DESCRIPTION OF EMBODIMENTS

Figure 1:
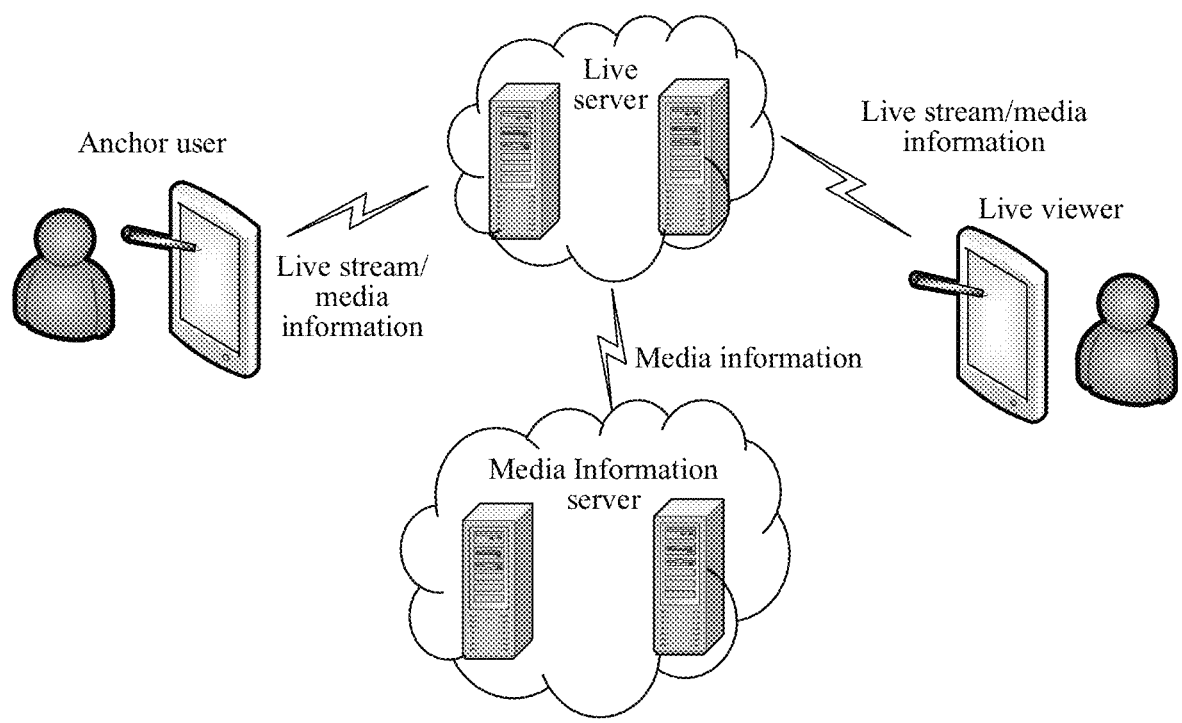
FIG. 1 is a schematic diagram of an optional architecture for pushing media information in a live broadcasting service according to an embodiment of this application.

The following further describes this application in detail with reference to the accompanying drawings and embodiments. It should be understood that the embodiments provided herein are merely used to explain this application but are not intended to limit this application. Additionally, the embodiments provided below are some embodiments used to implement this application, but are not intended to provide all embodiments used to implement this application. Embodiments obtained by a person skilled in the art by recombining technical solutions of the following embodiments without making inventive efforts, and other embodiments implemented based on this application all fall within the protection scope of this application.

It should be noted that, in the embodiments of this application, terms "includes", "include " or any other variants thereof are intended to cover nonexclusive inclusion, so that a method or an apparatus including a series of elements not only includes explicitly recorded elements, but also includes other elements without being explicitly listed, or includes inherent elements for implementing the method or the apparatus. In a case of no more limitations, elements limited by a sentence of "includes one . . . " do not exclude that other related elements (for example, steps in the method or units in the apparatus) further exist in the method or the apparatus including the elements.

For example, an information processing method provided in the embodiments of this application includes a series of steps, but the information processing method provided in the embodiments of this application is not limited to recorded steps. Likewise, a terminal provided in the embodiments of this application includes a series of units, but the terminal provided in the embodiments of this application is not limited to including explicitly recorded units, and may further include a unit that needs to be set for obtaining related information, or at the time of performing processing based on information.

Before this application is further described in detail, nouns and terms involved in the embodiments of this application are described, and the nouns and the terms involved in the embodiments of this application are applicable to the following explanations.

1) Anchor user, being a user in a live broadcasting service performing performance and sharing the performance.

2) Live viewer, being audience of performance performed by an anchor user in a live broadcasting service.

3) Live video stream, being a code stream that is applicable to being transmitted in a network and that is formed by encoding a video and an audio collected by an anchor user, and supporting being instantly decoded and played by a receive end without waiting for receiving all data.

4) Floating layer, being a temporary view that can float at any location on a display interface (various windows) of a client of a terminal and that has a particular display effect (for example, translucent), and being implemented by invoking a browser component.

5) Media information, information in any form such as an advertisement and news that needs to be pushed to a live viewer in a live broadcasting service. A type of a material included in an advertisement may be: a text, a picture, a video, a landing page link (linked to a page that an advertiser wishes a live viewer to access), a download link (a storage address of content such as a propaganda clip or an application installation package that an advertiser wishes a live viewer to download) and the like.

6) Live studio, being an application that corresponds to an anchor user, and that is used by the anchor user to publish different live broadcasting services on a live platform.

7) Live broadcasting service, being video and/or audio content of performance published by an anchor user in a live studio. According to a service rule of a live platform, the live broadcasting service is limited in aspects such as a time length and capacity.

8) Targeted push conditions, being conditions that is selected by an advertiser during advertisement push and that advertisement audience needs to conform to. There are "and" and "or" relationships between these conditions. If a gender male "and" a district Beijing "or" Tianjin are selected, a targeted condition is a male user in the Beijing district and a male user in the Tianjin district.

For pushing the media information to the live viewer in the live broadcasting service process, it is difficult to efficiently fuse the live broadcasting service and the media information. Using an example in which the media information is an advertisement, the problem existing in the solution for pushing the media information in the live broadcasting service is described with reference to the related technology, and the related technology below.

1) An anchor user holds a product name, an address of a landing page, and a two-dimensional code of the landing page with a hand and presents an advertisement in a host-read manner, but this manner has low efficiency, and is difficult to implement for massive to-be-pushed advertisements.

2) An advertisement is presented in a manner of adding a link, a shop name and a product name to a live studio. A live video stream needs to be encoded to add a link, a shop name and a product name to a video layer of the live video stream, and when the pushed advertisement needs to be switched, repetitive encoding operations on the live video stream are involved, resource overhead are large and efficiency is low.

3) A manner of adding a two-dimensional code of a landing page to the live studio is used by the live viewer to scan the code. On one hand, original content of the video layer of the live video stream is blocked, and on the other hand, the live video stream needs to be compressed to add the two-dimensional code, affecting quality of the live video stream.

For the foregoing problem, the embodiments of this application provide an information processing method for at least resolving the foregoing problem in a live broadcasting service, and a terminal for implementing an information processing method. A live broadcasting service is implemented between an anchor user terminal and a live viewer terminal by a using server and media information is pushed in the live broadcasting service.

For example, referring to FIG. 1, FIG. 1 is a schematic diagram of an optional architecture for pushing media information in a live broadcasting service according to an embodiment of this application. An anchor user terminal, a live viewer terminal, and a live server in which service logic used to support the live broadcasting service is deployed are involved. Additionally, a media information server in which service logic for pushing the media information is deployed is further involved, and service logic of the live server and service logic of the media information server are separately described.

1. The live server supports the live broadcasting service

The live server is used to support and implement the live broadcasting service between the anchor user and the live viewer. For the live broadcasting service, the anchor user terminal, the live server and the live viewer terminal are involved in initializing the anchor user, the live server establishes a live studio for the anchor user, verifies, according to a predetermined verification policy (for example, anchor user verification, or live server verification, or a combination of the two) the live viewer that requests to join the live studio, and records, for each live studio, an identifier of the anchor user, an identifier of the live studio and an identifier of the live viewer.

After initialization is completed, once receiving the live video stream from the anchor user, the live server sends the live video stream to the live viewer terminal joining the live studio, to be played in a live window of a live client.

For performing, by the anchor user, collection to form the live video stream, the anchor user terminal collects performance of the anchor user to form the media information in a video format and an audio format (a format is selected according to a need), compresses, encodes and encapsulates the media information to form a stream file, and transmits the stream file in a real time streaming or progressive streaming manner.

For encoding, a compression algorithm combination of the H.264 video compression algorithm plus the AAC audio compression algorithm may be used. Using an example in which video data is compressed and encoded by using the H.264 video compression algorithm, compression and encoding are implemented by using a video coding layer (VCL) and a network abstraction layer (NAL) of H.264 encoding, the video data is encoded at the video coding layer, the encoding includes content such as motion estimation and entropy encoding, and a data volume after the encoding is reduced, thereby adapting to network transmission.

For the live server, the live server may directly send the live video stream from the anchor user to the live viewer joining the live studio. Certainly, according to a condition of a network between the live server and a different live viewer, and a processing capability of the live viewer terminal, the live server may send the live video stream to the live viewer terminal.

The live viewer terminal receiving the live video stream decodes the live video stream and plays the decoded live video stream in the live window of the live client.

2. The media information server pushes the media information

Using an example in which the media information server is used for an advertisement push service, the media information server is used as an entry for providing an advertisement to the live server, and is connected to an advertisement database (storing various types of to-be-pushed advertisements), and the media information server performs matching between characteristics of users (the anchor user and the live viewer) provided by the live server and a targeted push condition of each advertisement, and determines a candidate advertisement to be pushed to the live viewer. The live server pushes an advertisement to the live client of the anchor user terminal according to a need, so that the anchor user selects an advertisement that needs to be pushed to the live viewer. Certainly, an advertisement may be pushed to the live client of the live viewer terminal, and the advertisement pushed to the live client is exposed in a passive manner. For example, when the live viewer views, in the live client, an activity recently initiated by the anchor user, an advertisement is exposed as activity content.

It should be noted that in the architecture shown in FIG. 1, a quantity of and types of servers may be adjusted according to a requirement, for example, according to actual resource overhead. When resource overhead of the live broadcasting service are large, service logic of the live broadcasting service may be deployed in a server cluster; and when resource overhead for pushing the media information are relatively small, service logic of the live broadcasting service and service logic for pushing the media information may be deployed in a same server, and flexible setting is performed according to a requirement. Therefore, servers are not distinguished as the media information server and the live server below.

Figure 2:
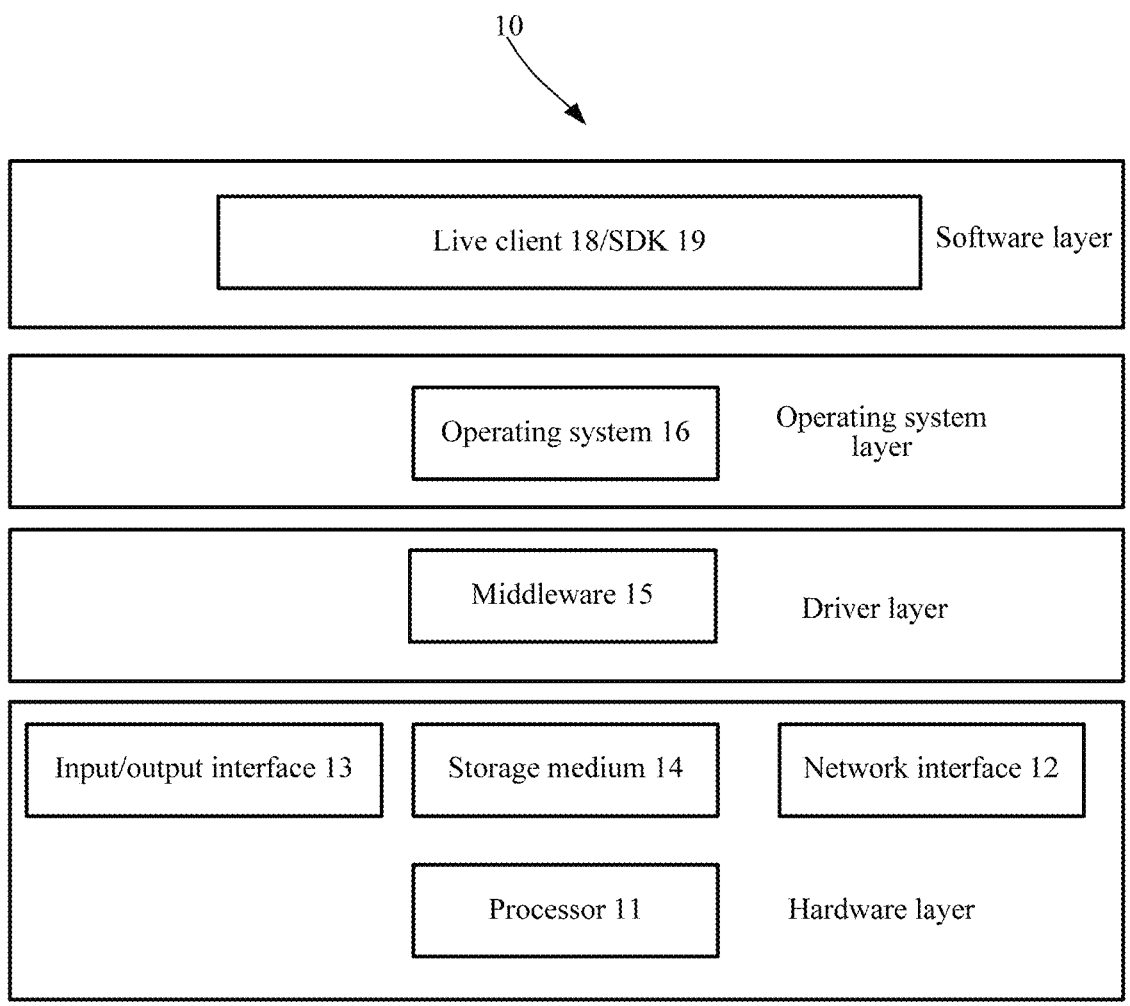
FIG. 2 is a schematic diagram of an optional software/hardware structure of a terminal 10 according to an embodiment of this application.

Referring to FIG. 2, FIG. 2 is a schematic diagram of an optional software/hardware structure of a terminal 10 according to an embodiment of this application. The terminal includes a hardware layer, a driver layer, an operating system layer and a software layer. However, a person skilled in the art should understand that the structure of the terminal shown in FIG. 2 is only an example, and does not constitute any limitation on the terminal structure. For example, the terminal may be provided with more components than those in FIG. 2 according to an implementation need, or some components are omitted according to an implementation need.

The hardware layer of the terminal includes a processor 11, an input/output interface 13, a storage medium 14 and a network interface 12, and the components may be connected to and communicate with each other by using a system bus.

The processor 11 may be implemented by using a central processing unit (content provider U), a microcontroller unit (MCU), an application-specific integrated circuit (ASIC) or a field-programmable gate array (FPGA).

The input/output interface 13 may be implemented by using an input/output device such as a display screen, a touch screen, or a speaker.

The storage medium 14 may be implemented by using a non-volatile storage medium such as a flash memory, a hard disk, or an optical disk, or may be implemented by using a volatile storage medium such as a double data rate (DDR) dynamic cache, where the storage medium 14 stores an executable instruction used to execute the foregoing information processing method.

For example, the storage medium 14 may be disposed in a centralized manner with other components of the terminal, or may be disposed in a distributed manner with other components of the terminal. The network interface 12 provides, to the processor 11, a capability of access to external data such as the storage medium 14 remotely disposed. For example, the network interface 12 may perform near field communication based on a near field communication (NFC) technology, a Bluetooth technology, or a ZigBee technology, and additionally, may further implement communication of communications standards such as CDMA and WCDMA and evolved standards of the communications standards.

The driver layer includes a middleware 15 used by an operating system 16 to identify the hardware layer and used to communicate with each component of the hardware layer, and may be, for example, a set of drivers for components of the hardware layer.

The operating system 16 is used to provide a user-oriented graphical interface. For example, the operating system 16 includes a plug-in icon, a desktop background and an application icon, and the operating system 16 supports a user in controlling a device through the graphical interface. A software environment such as an operating system type or a version of the foregoing device is not limited in this embodiment of this application. For example, the operating system 16 may be a Linux operating system, a UNIX operating system or another operating system.

The software layer includes a live client 18 and an SDK 19.

The live client 18 is used to be set in the anchor user terminal and the live viewer terminal to support implementation of the live broadcasting service. Specifically, the live client in the anchor user terminal is used to perform collection on the anchor user side to form a live video stream, and transmit the live video stream to the live client 18 in the live viewer terminal by using a server, and the live video stream is played in the live window of the live client 18 in the live viewer terminal.

The SDK 19 in the anchor user terminal is used to implement related functions for pushing the media informa-tion to the live viewer in the live broadcasting service, and the related functions include: 1) loading, to the live window of the live client, a button (entry) of a function related to pushing the media information; 2) establishing a floating layer in a manner of invoking a browser component or by using a JavaScript control, where the floating layer avoids the live window, or partially blocks the live window, a page for implementing a corresponding function is loaded to the floating layer, and a response is performed according to an operation of a user for a page; and 3) establishing a new window in a form of invoking a browser component to avoid or partially block the live window, where a page for implementing a corresponding function is loaded to the new window, and a response is performed according to an operation of a user for a page.

For an area used to push the media information being floating layer, a floating layer involved below includes the following several types:

Page configuration floating layer: a corresponding entry button is referred to as a first button that may be an icon loaded at any location of the live window, and a floating layer established in the live window before the live broadcasting service is initialized is used to load candidate the media information pushed to the live viewer, and (according to an operation) call out a page details floating layer to load details of the media information. Additionally, setting of the anchor user may be further received. For example, the media information pushed to the live viewer, a push policy and the like are set, and pushed by the SDK to the live viewer side after the live broadcasting service is initialized.

Page setting floating layer: a corresponding entry button is referred to as a second button that may be an icon loaded at any location of the live window, and a floating layer established in the live window after the live broadcasting service is initialized is used to load candidate the media information pushed to the live viewer, and call out, according to an operation on the media information in the page setting floating layer (for example, a click or double-click operation), the page details floating layer to load the details of the media information. Additionally, the media information that is pushed to the live viewer and that is set (for example, setting is performed by clicking a push button corresponding to the media information in the page floating layer) by the anchor user may be further received, the media information is stopped from being pushed, and the media information is reset (that is, the media information pushed to the live viewer is switched).

Page details floating layer: each page details floating layer is used to display details of one piece of media information, and a corresponding entry button is referred to as a third button that may be an icon loaded at any location of the live window, or may be an area of the corresponding media information in the page configuration floating layer and the page setting floating layer (certainly, the area does not include the push button of the media information). When the third button is operated, the third button used to load the details of the media information that include a material forming the media information.

Certainly, when an area used to push the media information is a window, setting may still be performed with reference to the foregoing different forms of floating layers. For brevity, details are not described herein again. When the area used to push the media information is implemented in a floating layer form, and particularly when a browser component is invoked and content is loaded to the floating layer, on one hand, decoupling from a live application at a display processing logic layer can be implemented, and on the other hand, content can be loaded by using an HTML5 page, and displayed content can be efficiently configured.

For implementation at the anchor user terminal, the information processing method provided in this embodiment of this application may be applied to supporting the following application scenario 1:

First, before the anchor user enables the live broadcasting service, the anchor user calls out the page configuration floating layer to view a list of candidate media information that may be pushed to the live viewer in the live broadcasting service process (pushed by the server, or pulled from the server), and may continue to call out the page details floating layer in the page configuration floating layer to view the details of the media information, so as to push the media information on a suitable occasion (for example, an occasion when a topic related to the media information is talked about) in the live broadcasting service process, so that the pushed media information is accepted by the live viewer more easily.

Secondly, in the live broadcasting service process, the anchor user calls out the page setting floating layer to view a list of candidate media information that may be pushed to the live viewer in the live broadcasting service process, sets the media information that needs to be pushed, and additionally, may further continue to call out the page details floating layer in the page setting floating layer to view the details of the media information.

Thirdly, in the live broadcasting service process, the anchor user may call out the page setting floating layer to stop pushing the media information, or switch the media information pushed to the live viewer.

Fourthly, the anchor user reports, to the server, a record of the media information pushed by the anchor user, and the server may select, according to the record, the media information that the anchor user tends to push/is good at pushing, to optimize subsequent recommendation of the anchor user for the media information.

Figure 3:
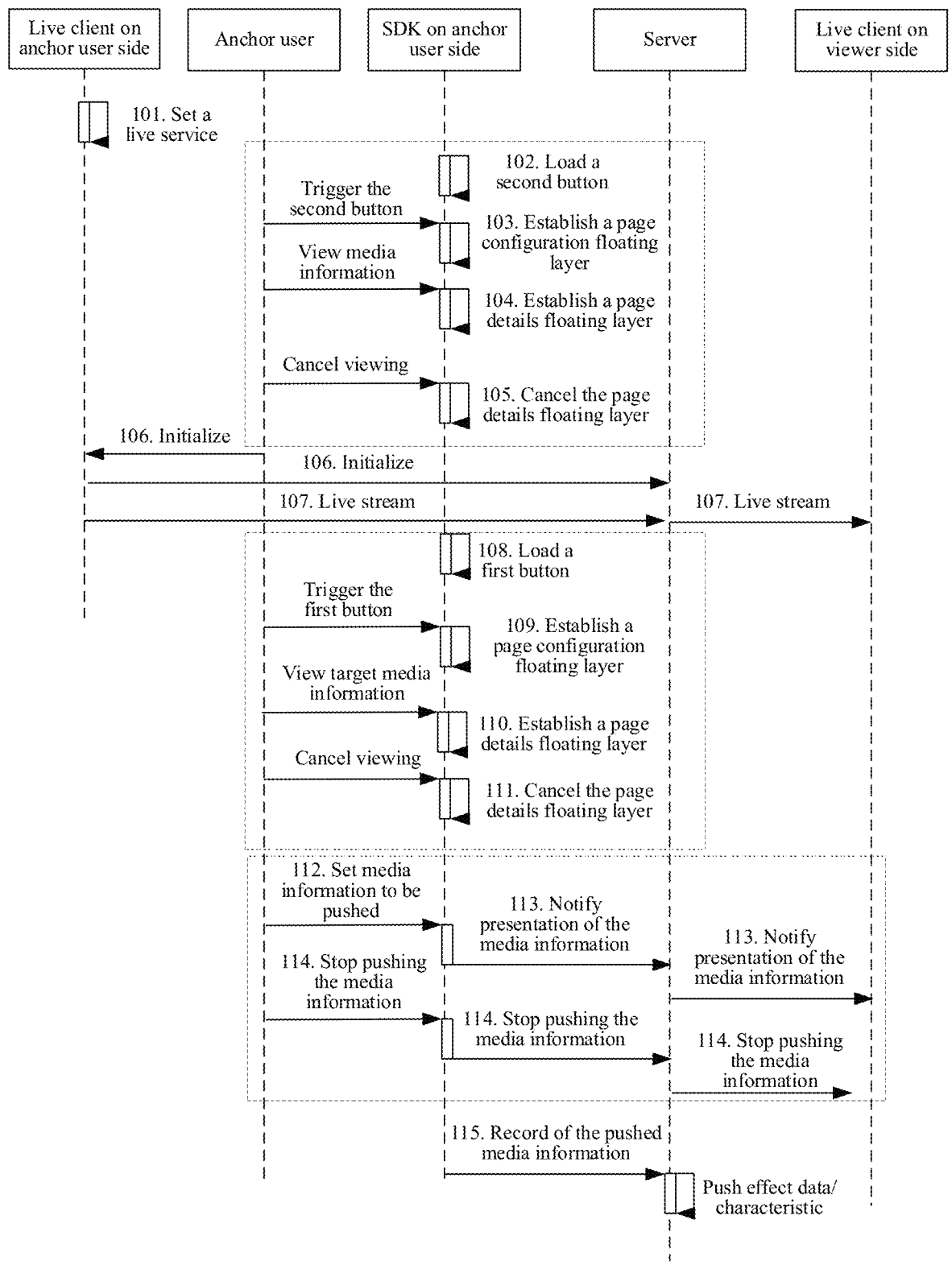
FIG. 3 is a schematic diagram of an optional process of implementing an information processing method in an anchor user terminal according to an embodiment of this application.

For the foregoing application scenario 1, referring to FIG. 3, FIG. 3 is a schematic diagram of an optional process of implementing an information processing method in an anchor user terminal according to an embodiment of this application. Unless otherwise stated, a live client and an SDK involved in the following description for FIG. 3 are both run in an anchor user terminal, and the method includes the following steps:

Step 101. Before a live broadcasting service is initialized, a live client displays a live window of the live broadcasting service, and receives setting of an anchor user for the to-be-initialized live broadcasting service.

For example, the live window before the live broadcasting service is initialized is used to receive information such as a name and a remark of a newly created live broadcasting service added by the anchor user to a live studio of the anchor user, to facilitate subsequent search of the anchor user.

Before the live broadcasting service is initialized, the anchor user is supported in understanding, by using the page configuration floating layer, the media information that can be pushed to the live viewer, and the page details floating layer may be called out to view details of each media information. This is described in step 102 to step 105.

Step 102. An SDK loads a second button to the live window, where the second button is an entry button of the page configuration floating layer.

Step 103. When receiving a trigger operation for the second button, the SDK invokes a browser component to establish the page configuration floating layer on the live window of the anchor user, where the page configuration floating layer covers some areas or all areas of the live window, and a list of candidate media information is loaded to the page configuration floating layer.

The loading a list of candidate media information is that, the SDK reads all of the media information list to a cache, and displays, according to the size of an available display area of the page configuration floating layer, all information in the media information list on the page configuration floating layer at a time; or in a label page display manner, some media information is displayed in each label page of the page configuration floating layer, and the media information in the cache is switched according to an operation of the anchor user (for example, slide in a left-right direction), thereby reducing blocking on the live window.

In an example, when the page configuration floating layer is established, the display area of the live window keeps unchanged, and the page configuration floating layer covers some areas of the live window. In another example, when the page configuration floating layer is established, the live window is shrunk according to a proportion, the page configuration floating layer covers an area exposed because the live window is shrunk, so that when viewing the details of the media information, the anchor can also see content of performance, to ensure an effect of the live broadcasting service.

It should be noted that the second button may be set by default. For example, the page configuration floating layer may be automatically loaded after setting of the anchor user for the to-be-initialized live broadcasting service is received. Providing an entry of the page configuration floating layer by using the second button can avoid blocking on the window of the live client, and avoid interference on the anchor user.

Step 104. When receiving a viewing operation for target media information at the page configuration floating layer, the SDK establishes a page details floating layer on the live window based on a browser component, where the page details floating layer occupies at least some areas covered by the page configuration floating layer and/or of the live window, and a material forming the target media information is loaded to the page details floating layer.

Specifically, the following several relationships exist between the page details floating layer, the live window, and the page configuration floating layer:

Relationship 1) When the page details floating layer is established, the display area of the live window keeps unchanged, and the page details floating layer and the page configuration floating layer do not block each other, and jointly cover some areas or all areas of the live window.

Relationship 2) When the page details floating layer is established, the display area of the live window keeps unchanged, and the page details floating layer blocks at least a part of the page configuration floating layer and the live window, that is, the page details floating layer covers some areas or all areas of the page configuration floating layer, and covers some areas or all areas of the live window.

Relationship 3) When the page details floating layer is established, the live window is shrunk according to a proportion, the page configuration floating layer and the page details floating layer jointly cover an area exposed because the live window is shrunk, so that when viewing the details of the media information, the anchor can also see content of performance, to ensure an effect of the live broadcasting service.

For example, the viewing operation may be any pre-supported type of operation, such as a click operation and a double-click operation.

Step 105. When receiving a viewing cancellation operation for the target media information (for example, when a button for returning to the page configuration floating layer is triggered) at the page configuration floating layer, the SDK cancels the page details floating layer of the target media information.

The anchor user cancels the page configuration floating layer and the page details floating layer, and initiates subsequent initialization of the live broadcasting service from the live client.

Step 106. The live client submits initialization of the live broadcasting service by using a server.

For example, an identifier of the live studio and an identifier of the anchor user that are to be established in the live studio are submitted to the server and are used to initialize the live broadcasting service.

Step 107. The live client collects media data on an anchor user side, and sends a collected live video stream to (added to the live studio of the anchor user) the live window of the live client in the live viewer terminal by using the server to perform playback.

It may be understood that, the performing collection on the anchor user side is that, media data from the anchor user is obtained. For example, collection is performed on at least one of the anchor user, and an environment in which the anchor user is located, and the media data may further be media data of an anchor client accessed by the anchor user, for example, a video recorded in advance by the anchor user, and may further be a third-party video (for example, real-time videos of various matches) accessed by the anchor user and audio comments of the anchor user.

Step 108. The SDK loads a first button to the live window, where the first button is an entry button of the page setting floating layer.

Step 109. When the SDK receives a trigger operation of the anchor user for the first button in the live window, the SDK invokes a browser component to establish the page configuration floating layer on the live window of the anchor user, and loads, to the page setting floating layer, a list of candidate media information pushed to the live viewer.

The SDK selects, according to a visual effect requirement, a manner of floating on the live window. For example, the page setting floating layer loads the media information list to the page setting floating layer in a manner of filling out from the bottom of the live client, and according to a quantity of the media information in the media information list, the page setting floating layer covers some areas or all areas of the live window.

It should be noted that the first button may be set by default, that is, the page setting floating layer is automatically loaded to the live window once the live broadcasting service is initialized. Providing an entry of the page setting floating layer by using the first button can avoid blocking on the live window in the live broadcasting service process, and avoid interference on the anchor user.

Additionally, the loading a list of candidate media information pushed to the live viewer is that, the SDK reads all of the media information list to a cache, and displays, according to the size of an available display area of the page setting floating layer, all information in the media information list on the page configuration floating layer at a time; or in a display manner of switching a plurality of label pages, some media information is displayed in each label page of the page setting floating layer, and the media information is switched according to an operation of the anchor user (for example, slide in a left-right direction), thereby reducing blocking on the live window.

In an embodiment, for a list of candidate media information, the SDK may pull, from the server, media information of at least one of the following types (certainly, or may receive media information of at least one of the following types actively pushed by the server): media data conforming to a characteristic of the anchor user; and candidate media information conforming to a characteristic of the live viewer.

In actual application, for an APP advertisement, the SDK is connected to an application market, and obtains an advertisement conforming to a characteristic from the application market, so that the anchor user chooses to push the advertisement to the live viewer. It is easy to overcome the problem in the related technology that when an advertisement is pushed in the live broadcasting service, an APP channel is limited and flexibly switching between contents cannot be performed.

When the media information is an advertisement, an advertisement conforming to a user characteristic may be an advertisement whose targeted push condition matches the user characteristic. When the media information is news, news conforming to a user characteristic may be news conforming to a user subscription condition. For example, the characteristic may include the following several situations:

1) User attribute, that is user related information, such as a region, an age, an educational status, and a terminal device type, and certainly that may be another type such as an income level.

2) Preference, that is an object in which a user is interested, such as a movie type liked by a user, a cooking style liked by a user, or a nation to which a user likes travelling.

3) Behavior label, that represents a behavior casually or usually implemented by a user, such as, buying newspaper on the way to work, or playing a game in a metro train.

At the page configuration floating layer, the anchor user is supported in executing the following types of operations: 1) viewing details of the media information; 2) setting the media information that needs to be pushed; 3) stopping pushing the selected media information pushed to the live viewer; and 4) switching the media information pushed to the live viewer, that is, first, stopping pushing the selected media information pushed to the live viewer, and then resetting the media information pushed to the live viewer.

Step 110 and step 111 are used to describe the viewing details of the media information.

Step 110. When receiving, at the page configuration floating layer, a viewing operation of the anchor user for the target media information (for example, a click operation), the SDK establishes the page details floating layer based on the browser component, and loads the material forming the target media information to the page details floating layer.

By establishing a details floating page, the anchor user may understand the details of the media information, and for example, for an APP advertisement, may understand a function of an APP propagated by the advertisement, so that the function of the APP may be introduced precisely in place in the live broadcasting service process. A case in which the function of the APP can only be mechanically introduced by the anchor user because the anchor user does not understand the APP is avoided, to improve an effect of pushing the media information.

Step 111. When receiving a viewing cancellation operation for the target media information (for example, when a returning button of the page configuration floating layer is triggered) at the page configuration floating layer, for example, when the returning button is triggered, the SDK cancels the page details floating layer of the target media information.

It should be noted that step 110 and step 111 are a response to an operation that needs to be implemented only when the anchor user needs to understand the details of the media information. Therefore, when the anchor user understands the media information and does not need to view the details, step 110 and step 111 are steps that may be executed by default.

By presenting, to the anchor user by using the page configuration floating layer, a list of media information that can be pushed to the live viewer, the anchor user may select acquainted/preferred media information to be pushed to the live viewer in a live process. For example, the anchor user usually selects a topic consistent with or close to a topic of the current live broadcasting service (for example, when a topic is an online game, the anchor tends to choose to push an online game APP). This fuses content of the live broadcasting service and the media information, so that the pushed media information is accepted by the live viewer more easily, and for an advertisement, conversion of an advertisement effect (for example, click, purchase and information retention of the live viewer) can be urged.

Step 112. Describe setting of the media information that needs to be pushed.

Step 112. When receiving, at the page setting floating layer, an operation of the anchor user for setting the media information, the SDK determines the media information that is set by the anchor user as to-be-pushed media information, and turns to step 113.

For example, the SDK correspondingly loads a button with a word of "recommend" or "push" to the page setting floating layer for the media information in the list, and when receiving an operation of the anchor user for the button, the SDK identifies the corresponding media information as the to-be-pushed media information.

Step 113. The SDK reports to-be-pushed media information (for example, an identifier of the media information, or original data of the media information) that is set by the anchor user to the server, and pushes the media information to an SDK of the live viewer terminal through the server, and the SDK in the live viewer terminal performs presentation at a floating layer on the live window of the live client of the live viewer terminal.

The stopping pushing/switching the media information pushed to the live viewer is described with reference to step 114.

Step 114. When receiving an operation for the anchor user to stop pushing media information, the SDK instructs the live viewer to stop presenting received media information in the corresponding live window.

For example, in the live broadcasting service process, after the anchor sets, at the page setting floating layer, the media information pushed to the live viewer (step 112), and the SDK pushes the media information to the live viewer, if the anchor user intends to stop the pushed media information from being presented at the floating layer of the live window of the live viewer and perform, at the page setting floating layer, a cancellation operation for the media information that is set, for example, re-click a "recommend" button corresponding to the media information to make the button be displayed in reverse color, the SDK records the media information in a push stop state and notifies the SDK of the live viewer terminal by using the server, and the SDK of the live viewer terminal stops presenting the corresponding media information.

Additionally, after the anchor user stops pushing the media information, if the anchor user intends to push another media information, it may be understood that, by executing step 112 to step 114, the SDK supports the anchor user in viewing the media information at the page setting floating layer and resetting the media information to be newly pushed, to support the anchor user in pushing the media information to the live viewer according to a requirement in the live broadcasting service process.

It may be seen that, when media information is pushed to a live viewer in a live broadcasting service, a live video stream and the media information are independently sent to the live viewer. The transmission of the live video stream and transmission of the media information do not affect each other; and the live video stream is played in a live window on a live viewer side. The media information is presented based on a floating layer. The media information and the live video stream are presented by using different mechanisms, to fuse the media information and the live video stream in transmission and presentation aspects in a weak coupling manner. When the pushed media information needs to be switched, recoding processing on the live video stream is not involved, thereby saving resource overhead.

Step 115. The SDK reports, to the server, a record of the media information pushed by the anchor user, combines the record and a record of the received media information reported by the live viewer, determines push effect data of the media information pushed by the anchor user, and determines characteristics of the anchor user and the live viewer.

For an APP advertisement, a record of advertisements pushed by the anchor user includes: an advertisement pushed by the anchor user, and an advertisement that the anchor user cancels pushing; and a record of advertisements received by the live viewer includes: an advertisement received by the live viewer, and conversion effect data of each advertisement (for example, an exposed advertisement, an advertisement from which a downloading behavior is generated, or an advertisement from which a behavior of accessing a landing page is generated). The server determines the characteristics of the anchor user and the live viewer according to the records.

1) The server determines the characteristics of the anchor user and the live viewer with reference to the records of the received advertisements, and pushes, to the anchor user, an advertisement conforming to the characteristics of the anchor user and the live viewer, so that the anchor user chooses to push the advertisement in the live broadcasting service process, the advertisement pushed the anchor user can conform to the user, and push precision is high and conforms to the requirement of the live viewer, to avoid a problem of causing interference to the live viewer because of blindly pushing an advertisement to the live viewer.

2) The server collects, with reference to the received record, statistics on an exposure quantity of an advertisement suspended on a live viewer side, a click quantity, an APP downloading quantity, an APP downloading page access quantity (push effect data) and the like, and precisely forms, according to a push effect of the advertisement, charging data of parties on an ecological chain of pushing the advertisement: the anchor user, the live platform, and the application market (providing an APP downloading service), to form a virtuous cycle of the ecological chain of pushing the advertisement.

For implementation of the information processing method provided in this embodiment of this application at the anchor user terminal, different from the foregoing application scenario 1) in which to-be-pushed media information is set only in the live broadcasting service process, another application scenario 2) supports the anchor user in setting to-be-pushed media information in the live broadcasting service process before the live broadcasting service is initialized, where the setting includes setting a corresponding push policy, to automatically push the media information to the live viewer in the live broadcasting service process.

Specifically, in the application scenario 2:

First, before the live broadcasting service is initialized, the anchor user calls out the page configuration floating layer to view a list of candidate media information that may be pushed to the live viewer in the live broadcasting service process (pushed by the server, or pulled from the server), and continues to call out the page details floating layer in the page configuration floating layer to view the details of the media information, to set to-be-pushed media information and a push policy.

Secondly, in the live broadcasting service process, the media information preset by the anchor user is pushed to the live viewer according to the push policy.

Figure 4:
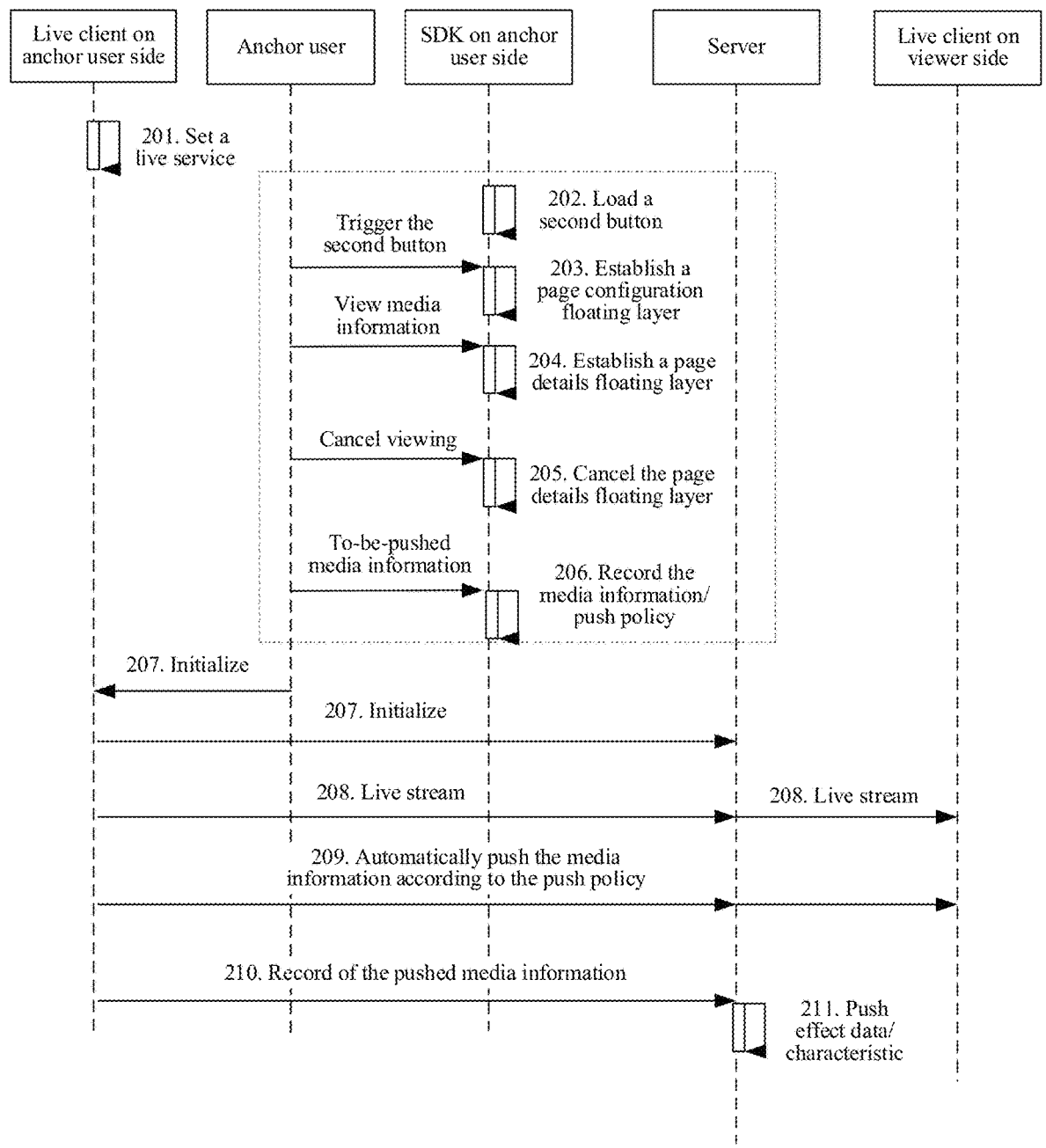
FIG. 4 is a schematic diagram of an optional process of implementing an information processing method in an anchor user terminal according to an embodiment of this application.

For the foregoing application scenario 2, referring to FIG. 4, FIG. 4 is a schematic diagram of an optional process of implementing an information processing method in an anchor user terminal according to an embodiment of this application. Unless otherwise stated, a live client and an SDK involved in the following description for FIG. 4 are both run in an anchor user terminal, and the method includes the following steps:

Step 201. Before a live broadcasting service is initialized, a live client displays a live window of the live broadcasting service, and receives setting of an anchor user for the to-be-initialized live broadcasting service.

For example, the live window before the live broadcasting service is initialized is used to receive information such as a name and a remark of a newly created live broadcasting service added by the anchor user to a live studio of the anchor user, to facilitate subsequent search of the anchor user.

Before the live broadcasting service is initialized, the anchor user is supported in understanding, by using the page configuration floating layer, the media information that is pushed to the live viewer, and the page details floating layer may be called out to view details of the media information. This is described in step 202 to step 205.

Step 202. An SDK loads a second button to the live window, where the second button is an entry button of the page configuration floating layer.

Step 203. When receiving a trigger operation for the second button, the SDK invokes a browser component to establish the page configuration floating layer on the live window of the anchor user, where the page configuration floating layer covers some areas or all areas of the live window, and a list of candidate media information is loaded to the page configuration floating layer.

The loading a list of candidate media information is that, the SDK reads all of the media information list to a cache, and displays, according to the size of an available display area of the page configuration floating layer, all information in the media information list on the page configuration floating layer at a time; or in a label page display manner, some media information is displayed in each label page of the page configuration floating layer, and the media information in the cache is switched according to an operation of the anchor user (for example, slide in a left-right direction), thereby reducing blocking on the live window.

Step 204. When receiving a viewing operation for target media information at the page configuration floating layer, the SDK establishes a page details floating layer on the live window based on a browser component, where the page details floating layer occupies at least some areas covered by the page configuration floating layer and/or of the live window, and a material forming the target media information is loaded to the page details floating layer.

Specifically, the following several relationships exist between the page details floating layer, the live window, and the page configuration floating layer:

Relationship 1) The page details floating layer and the page configuration floating layer do not block each other, and jointly cover some areas or all areas of the live window.

Relationship 2) The page details floating layer blocks at least a part of the page configuration floating layer and the live window, that is, the page details floating layer covers some areas or all areas of the page configuration floating layer, and covers some areas or all areas of the live window.

For example, the viewing operation may be any pre-supported type of operation, such as a click operation and a double-click operation.

Step 205. When receiving a viewing cancellation operation for the target media information (for example, when a button for returning to the page configuration floating layer is triggered) at the page configuration floating layer, the SDK cancels the page details floating layer of the target media information.

Step 206. The SDK receives to-be-pushed media information that is set by the anchor user.

In an embodiment, when receiving, at the page configuration floating layer, a list of to-be-pushed media information set by the anchor user, the SDK further receives a push policy set by the anchor user for the to-be-pushed media information; and the push policy supports the anchor user in performing setting in the following aspects:

1) Time of pushing the media information, such as a time interval of switching the pushed media information, where when a recorded time of the time interval arrives, next media information is automatically pushed to the live viewer; and 2) Order of pushing the media information, which is randomly pushed by default.

After setting the to-be-pushed media information and the push policy at the page configuration floating layer, the anchor user cancels the page configuration floating layer, and initiates subsequent initialization of the live broadcasting service from the live client.

Step 207. The live client submits initialization of the live broadcasting service by using a server.

For example, an identifier of the live studio and an identifier of the anchor user that are to be established in the live studio are submitted to the server and are used to initialize the live broadcasting service.

Step 208. The live client collects media data on an anchor user side, and sends a collected live video stream to (added to the live studio of the anchor user) the live window of the live client in the live viewer terminal by using the server to perform playback.

Step 209. The SDK sends, according to the push policy, the to-be-pushed media information set by the anchor user to a floating layer on the live window of the live client of the live viewer terminal to be displayed.

The SDK sequentially reports, according to a media information push order and an interval time that are set in the push policy, to-be-pushed media information (for example, an identifier of the media information, or original data of the media information) that is set by the anchor user to the server, and pushes the media information to an SDK of the live viewer terminal through the server, and the SDK in the live viewer terminal performs sequential presentation at a floating layer on the live window of the live client of the live viewer terminal.

For the anchor user, by using the to-be-pushed media information and the push policy that are preset, the media information is automatically pushed to the live viewer, the anchor user can pay more attention to performance in the live broadcasting service process, and moreover the anchor user may select acquainted/preferred media information to be pushed to the live viewer in a live process, for example, the anchor user usually selects a topic consistent with or close to a topic of the current live broadcasting service (for example, when a topic is an online game, the anchor tends to choose to push an online game APP). This fuses content of the live broadcasting service and the media information, so that the pushed media information is accepted by the live viewer more easily, and for an advertisement, conversion of an advertisement effect (for example, click, purchase and information retention of the live viewer) can be urged.

It may be understood that, based on the foregoing record of step 208 to step 211 in FIG. 3, in the live broadcasting service process, the SDK may still load the first button to the live window. When the anchor user operates the first button, the page setting floating layer is established, a list of to-be-recommended media information that is set by the anchor user before the live broadcasting service is initialized is loaded, and the page details floating layer is called out according to the operation of the anchor user to load the details of the media information. Additionally, the SDK supports the anchor user in updating, at the page setting floating layer, a preset policy of automatically pushing the media information, for example, updating the interval time, updating the push order of the media information, updating (adding or deleting) to-be-recommended media information, stopping pushing the media information being currently pushed to the live viewer, and switching the media information pushed to the live viewer.

Step 210. The SDK reports, to the server, a record of the media information received by the live viewer, combines the record and a record of the received media information reported by the anchor user, determines push effect data of the media information pushed by the anchor user, and determines characteristics of the anchor user and the live viewer.

For an APP advertisement, refer to step 117. Additionally, the server may further push, according to the characteristic of the live viewer, an advertisement conforming to the characteristic of the live viewer to the live viewer, and when pushing no advertisement to the live viewer, the anchor user can still understand an advertisement related to the live broadcasting service at the activity details page floating layer.

For implementation of the information processing method provided in this embodiment of this application at the live viewer terminal, corresponding to the foregoing application scenario 1) and application scenario 2), for the media information pushed by the anchor user in either of the foregoing application scenarios, an application scenario 3) in which the live viewer terminal presents the media information is related to the following several aspects:

First, when watching the live window, once receiving the media information pushed from the anchor user, the live viewer loads a third button to the live window to perform prompt.

Secondly, the live viewer may click the third button to call out the page details floating layer on the live window to view the details of the media information, and for an APP advertisement, an APP is downloaded or a downloading page of an APP is accessed in the page details floating layer according to a need.

Thirdly, when watching the live window, the live viewer loads the second button to the live window, and the live viewer may call out the page setting floating layer in the live window by clicking the second button, to view the media information such as the media information pushed by the anchor user, or the media information pushed by the server (different from the media information pushed by the anchor user).

Figure 5:
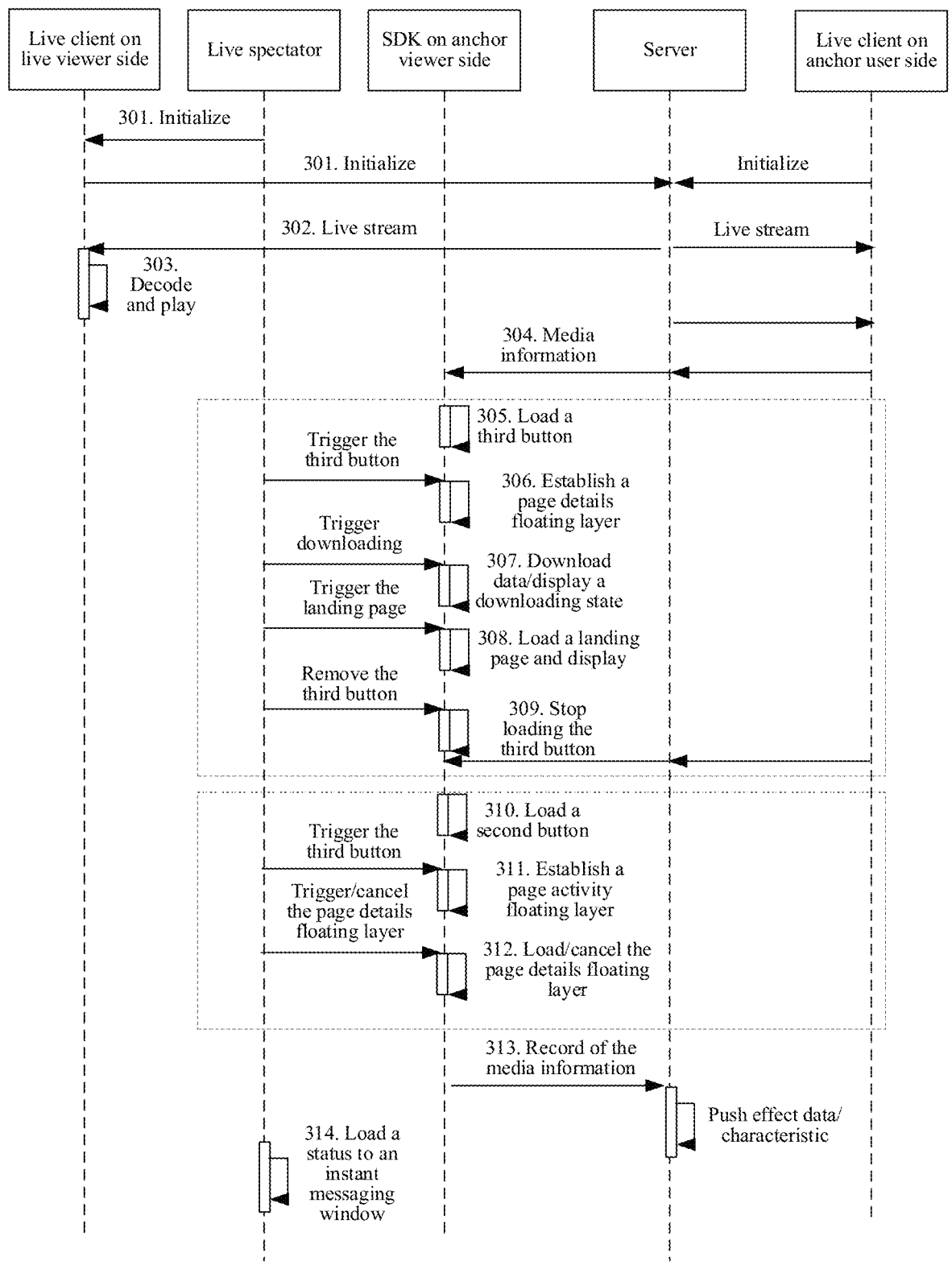
FIG. 5 is a schematic diagram of an optional process of implementing an information processing method in a live viewer terminal according to an embodiment of this application.

For the foregoing application scenario 3), referring to FIG. 5, FIG. 5 is a schematic diagram of an optional process of implementing an information processing method in a live viewer terminal according to an embodiment of this application. Unless otherwise stated, a live client and an SDK involved in the following description for FIG. 5 are both run in a live viewer terminal, and the method includes the following steps:

Step 301. The live client initializes a live broadcasting service between a live viewer and an anchor user.

The live client loads a live studio list to be selected by the live viewer, and initiates the live broadcasting service initialization to a server based on an identifier of a live studio selected by the live viewer, and the server records the live studio that the live viewer joins.

Step 302. The live client receives a live video stream sent by the anchor user.

Step 303. The live client performs decoding and playback in a live window based on the received live video stream.

Step 304. The SDK receives media information sent by the anchor user.

In an embodiment, when receiving the media information, the SDK instantly loads a corresponding functional button as an entry button for viewing details of the media information, to support the live viewer in viewing the details of the media information, and support the live viewer in removing the button to cancels this push, to avoid interference. Description is performed with reference to step 305 to step 309.

In an embodiment, a functional entry button for viewing the media information pushed by the anchor user last time is provided on the live window, to support a spectator in viewing the media information, or the button may be removed according to a need (pay attention to performance of an anchor, and temporarily does not intend to view the media information), to avoid interference. Description is performed with reference to step 305 to step 309.

Step 305. The SDK loads a third button to the live window of the live viewer.

An operation of the SDK for loading the third button is synchronous with receiving the media information, that is, a function for viewing the media information pushed by the anchor user recently is provided by using the third button. The third button may be a floating button loaded at any location of the live window, and to prevent live content from being blocked, the third button may be loaded in an edge area of the live window.

Step 306. When detecting a trigger operation for the third button, the SDK invokes a browser component to establish the page details floating layer on the live window of the anchor user, and loads a material included in the received the media information to the page details floating layer to be displayed.

The loading a material included in candidate media information is that, the SDK reads all materials of a piece of media information to a cache, and displays, according to the size of an available display area of the page details floating layer, all materials of the media information on the page details floating layer at a time; or in a label page display manner, some materials of media information is displayed in each label page of the page details floating layer (for example, a text is displayed in a label page 1, and a picture is displayed in a label page 2), and the media information in the cache is switched according to an operation of the live viewer (for example, slide in a left-right direction), thereby reducing blocking on the live window.

In an example, when the page details floating layer is established, the display area of the live window keeps unchanged, and the page details floating layer covers some areas of the live window. In another example, when the page details floating layer is established, the live window is shrunk according to a proportion, the page details floating layer covers an area exposed because the live window is shrunk, so that when viewing the details of the media information, the live viewer does not omit content of the live window.

Usually, materials of the media information include a text, a picture and the like, and further include a landing page link and a download link for an advertisement. Description is performed with reference to step 307 and step 308.

Step 307. When a material loaded to the page details floating layer includes a download link, if the live viewer implements a downloading operation (for example, clicks a downloading button loaded to the page details floating layer), obtain data of the corresponding download link according to the operation of the live viewer. Additionally, a download status such as a downloading progress or downloading suspension may be further displayed in real time in various forms (for example, icon) at the page details floating layer.

Step 308. When the material loaded to the page details floating layer includes a landing page link, if the live viewer implements a jump operation (for example, clicks the landing page link in the page details floating layer), load a page of a corresponding landing page to the page details floating layer according to the operation of the anchor user.

Because in an operation process for the page details floating layer, the live window is not completely blocked, on one hand, the live viewer may be helped understand, in time, the media information pushed by the anchor user, and on the other hand, watching performance of the anchor in the live window by the live viewer is not affected.

Step 309. When receiving a removing operation for the third button, the SDK stops loading the third button.

For example, when detecting that the third button is pressed, the SDK provides an optional operation prompt such as "click to view details" or "drag to remove this push", and particularly, when receiving a dragging operation for the second button, the SDK prompts that push is to be removed in cooperation with a dynamic effect.

In another embodiment, after the live broadcasting service is initialized, the SDK may provide, in the live window, an entry button of the page setting floating layer for viewing the media information list, so that the live viewer views historical information pushed by the anchor user. For example, when removing the media information pushed in real time by using the second button, the live viewer still may call out the page setting floating layer by using the third button to view a list of historical media information pushed by the anchor user and the details of the media information, to avoid information omission. With reference to step.

Step 310. The SDK loads a second button to the live window of the live viewer.

Step 311. When receiving a trigger operation for the second button, the SDK invokes a browser component to establish the page setting floating layer, and loads a media information list to the page setting floating layer.

For example, the media information list includes the historical media information pushed by the anchor user, and additionally, when the anchor user pushes no the media information, the list may include the media information pushed by the server. Certainly, the list may include both the historical media information pushed by the anchor user and the media information pushed by the server.

Particularly, to help the live viewer understand the media information pushed by the anchor user, the list preferably displays the media information pushed by the anchor user, or the media information pushed by the anchor user is displayed in a manner (for example, in bold) different from that of the media information pushed by the server.

It may be understood that, that the SDK loads a media information list is that, the SDK reads all media information included in the list to a cache, and displays, according to the size of an available display area of the page setting floating layer, the media information in the list on the page setting floating layer at a time; or in a label page display manner, the media information in the list is displayed in each label page of the page setting floating layer, and the media information in the cache is switched according to an operation of the live viewer (for example, slide in a left-right direction), thereby reducing blocking on the live window.

Step 312. The SDK for pushing an advertisement loads the page details floating layer of the target media information according to the operation of the live viewer, and cancels the page details floating layer according to the user operation.

When receiving a trigger operation for the second button, the SDK invokes a browser component to establish the page setting floating layer, and loads a media information list to the page setting floating layer, and the SDK supports the live viewer in viewing the details of the media information in the list.

For example, when receiving, at the page setting floating layer, a viewing operation for the target media information in the list, the SDK invokes the browser component to establish the page details floating layer, and loads a material included in the target media information to the page details floating layer to be displayed. In particular, for an advertisement:

1) When a material loaded to the page details floating layer includes a download link, if the live viewer implements a downloading operation (for example, clicks a downloading button loaded to the page details floating layer), data of the corresponding download link is downloaded according to the operation of the live viewer. Additionally, a download status such as a downloading progress or downloading suspension may be further displayed in real time in various forms (for example, icon) at the page details floating layer.

2) When the material loaded to the page details floating layer includes a landing page link, if the live viewer implements a jump operation (for example, clicks the landing page link in the page details floating layer), a page of a corresponding landing page is loaded to the page details floating layer according to the operation of the anchor user.

When receiving, at the page configuration floating layer, a viewing cancellation operation for the target media information (for example, when the live viewer clicks a location beyond the page details floating layer, or clicks a returning button in the page details floating layer), the SDK cancels the page details floating layer of the target media information.

In another embodiment, in step 313, the SDK intermittently reports, to the server, a record of the media information received by the live viewer. The record is used by the server to determine characteristics (including a user attribute, a behavior label and a preference) of the anchor user, and update, based on the characteristics, candidate media information pushed to the anchor user, and the candidate media information is selected by the anchor user and pushed to the live viewer in the live broadcasting service process.

For example, for an advertisement, a record may be a presented advertisement and a non-presented advertisement of advertisements received by the live viewer, an advertisement in which there is a downloading behavior, and an advertisement of accessing a landing page, so that the server collects statistics on exposure data, click data and the like of an advertisement on the user side; and additionally, determines a characteristic such as preference of the live viewer and a behavior label to select an advertisement conforming to the characteristic of the live viewer, and pushes the advertisement to the anchor user, so that the anchor user chooses to push the advertisement to the live viewer, to improve precision of pushing an advertisement to the live viewer.

Accordingly, the media information pushed by the anchor user is media information that can conform to the user characteristic, push precision is high and conforms to the requirement of the live viewer, to avoid a problem of causing interference to the live viewer because the media information is blindly pushed to the live viewer.

In another embodiment, in step 314, a status of media information correspondingly received by each live viewer is loaded to an instant messaging window of the live viewer, where the status includes at least one of the following: media information presented by each live viewer; a download link accessed by each live viewer; and a landing page accessed by each live viewer. As such, live viewers in a same live studio can share, in time, the media information pushed by the anchor, to fuse the live broadcasting service and the shared media information.

Figure 6:
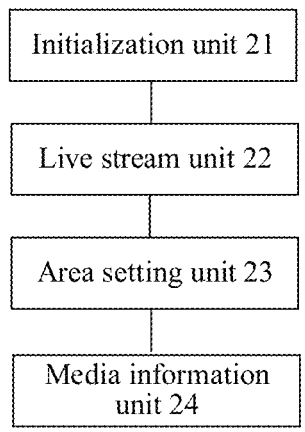
FIG. 6 is a schematic diagram of an optional functional structure of a terminal on an anchor user side according to an embodiment of this application.

For a terminal of an anchor user of a live broadcasting service, referring to FIG. 6, FIG. 6 is a schematic diagram of an optional functional structure of a terminal 20 according to an embodiment of this application. The terminal includes a processor and a memory, the processor being capable of running a computer executable instruction in each functional unit on the memory, and functional units on the memory including: an initialization unit 21, initializing a live broadcasting service between an anchor user and a live viewer; a live video stream unit 22, performing media data collection on an anchor user side, and sending the collected live video stream to a live window of the live viewer to perform playback; an area setting unit 23, establishing a media information push area based on a live window of the anchor user, loading, to the established area, candidate media information pushed to the live viewer, and determining to-be-pushed media information selected by the anchor user; and a media information unit 24, sending the to-be-pushed media information to the media information push area of the live viewer to be displayed.

In an embodiment, the area setting unit 23 queries a server for media data conforming to a characteristic of the anchor user, and/or queries the server to obtain candidate media information conforming to a characteristic of the live viewer.

In an embodiment, the area setting unit 23 invokes, after the live broadcasting service is initialized, a browser component to establish a page setting area on the live window of the anchor user, loads a list of candidate media information to the page setting area, and determines to-be-pushed media information that is set by the anchor user in the page setting area.

In an embodiment, the area setting unit 23 invokes, after the live broadcasting service is initialized and when a trigger operation for a first button in the live window of the anchor user is received, a browser component to establish a page setting area on the live window of the anchor user, loading a list of candidate media information to the page setting area, and determining to-be-pushed media information that is set by the anchor user in the page setting area.

In an embodiment, the area setting unit 23 establishes a corresponding page details area when a viewing operation for target media information is received in the page setting area, and loads a material forming the target media information to the page details area; and cancels the page details area of the target media information when a viewing cancellation operation for the target media information is received in the page setting area.

In an embodiment, the area setting unit 23 invokes, before the live broadcasting service is initialized, a browser component to establish a page configuration area on the live window of the anchor user; and the area setting unit 23 loads a list including candidate media information pushed to the live viewer to the page configuration area.

In an embodiment, the area setting unit 23 invokes, when a second button is loaded to the live window and a trigger operation for the second button is received, a browser component to establish a page configuration area on the live window of the anchor user.

In an embodiment, the area setting unit 23 determines to-be-pushed media information that is set by the anchor user in the page configuration area.

In an embodiment, the media information unit 24 sends, based on the loading a list including candidate media information pushed to the live viewer to the page configuration area after the live broadcasting service is initialized, to-be-pushed media information that is set by the anchor user before the live broadcasting service is initialized to the area of the live window of the live viewer to be displayed.

In an embodiment, the area setting unit 23 establishes a page details area based on a browser component when a viewing operation for target media information is received in a page configuration area, and loads a material forming the target media information to the page details area; and cancels the page details area of the target media information when a viewing cancellation operation for the target media information is received in the page configuration area.

In an embodiment, the media information unit 24 instructs, when an operation for the anchor user to stop pushing media information is received, the live viewer to stop presenting received media information in the corresponding live window.

In embodiment, the media information unit 24 reports a record of media information of the anchor user to a server, where the record is used by the server to update a characteristic of the anchor user, and updates, based on the updated characteristic, candidate media information pushed to the live viewer, where the record includes: to-be-pushed media information that is set by the anchor user; and media information that is stopped from being sent and that is set by the anchor user.

In an embodiment, the area setting unit 23 establishes a media information push window in a manner of avoiding the live window or partially blocking the live window; or establishes a media information push floating layer in a manner of avoiding the live window or partially blocking the live window.

Figure 7:
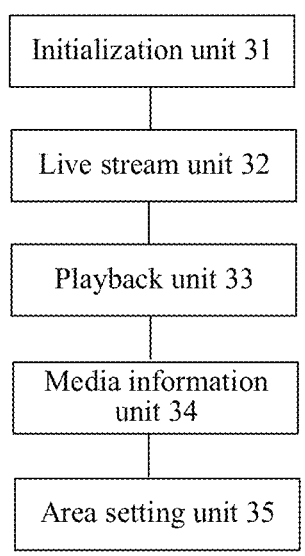
FIG. 7 is a schematic diagram of an optional functional structure of a terminal on a live viewer side according to an embodiment of this application.

For a terminal of a live viewer of a live broadcasting service, referring to FIG. 7, FIG. 7 is a schematic diagram of an optional functional structure of a terminal 30 according to an embodiment of this application. The terminal includes a processor and a memory, the processor being capable of running a computer executable instruction in each functional unit on the memory, and functional units on the memory including: an initialization unit 31, initializing a live broadcasting service between a live viewer and an anchor user; a live video stream unit 32, receiving a live video stream sent by the anchor user; a playback unit 33, performing playback in a live window of the live viewer based on the received live video stream; a media information unit 34, receiving media information sent by the anchor user; and an area setting unit 35, establishing a media information push area in the live window of the live viewer, and loading the received media information to the established area to be displayed.

In an embodiment, the area setting unit 35 loads a third button to the live window of the live viewer when the media information sent by the anchor user is received; invokes, when detecting a trigger operation for the third button, a browser component to establish a page details area on the live window of the anchor user, and loads a material included in the received the media information to the page details area to be displayed; and stops, when a removing operation for a third button is received, loading the third button.

In an embodiment, the area setting unit 35 loads a second button to the live window of the live viewer; and invokes a browser component to establish a page setting area when a trigger operation for the second button is received, and loads a media information list to the page setting area, where the media information list includes: historical media information sent by the anchor user; and media information pushed by a server.

In an embodiment, the area setting unit 35 invokes a browser component to establish a page details area when an operation for target media information in the list is received in the page setting area, and loads a material included in the target media information to the page details area to be displayed; and cancels the page details area of the target media information when a viewing cancellation operation for the target media information is received in the page configuration area.

In an embodiment, the area setting unit 35 downloads, when the material loaded to the page details area includes a download link, data of the corresponding download link according to an operation of the live viewer; and loads, when the material loaded to the page details area includes a landing page link, a page of a corresponding landing page to the page details area according to an operation of the anchor user.

In an embodiment, the media information unit 34 reports, to the server, a record of the media information received by the live viewer, where the record is used by the server to update a characteristic of the anchor user, and updates, based on the updated characteristic, candidate media information pushed to the live viewer, where the record includes: presented media information and non-presented media information in the media information received by the live viewer.

In an embodiment, the live video stream unit 32 loads, to an instant messaging window of the live viewer, a status of media information correspondingly received by each live viewer, where the status includes at least one of the following: media information presented by each live viewer; a download link accessed by each live viewer; and a landing page accessed by each live viewer.

In an embodiment, the area setting unit 35 establishes a media information push window in a manner of avoiding the live window or partially blocking the live window; or establishes a media information push floating layer in a manner of avoiding the live window or partially blocking the live window.

Figures 1, 8:
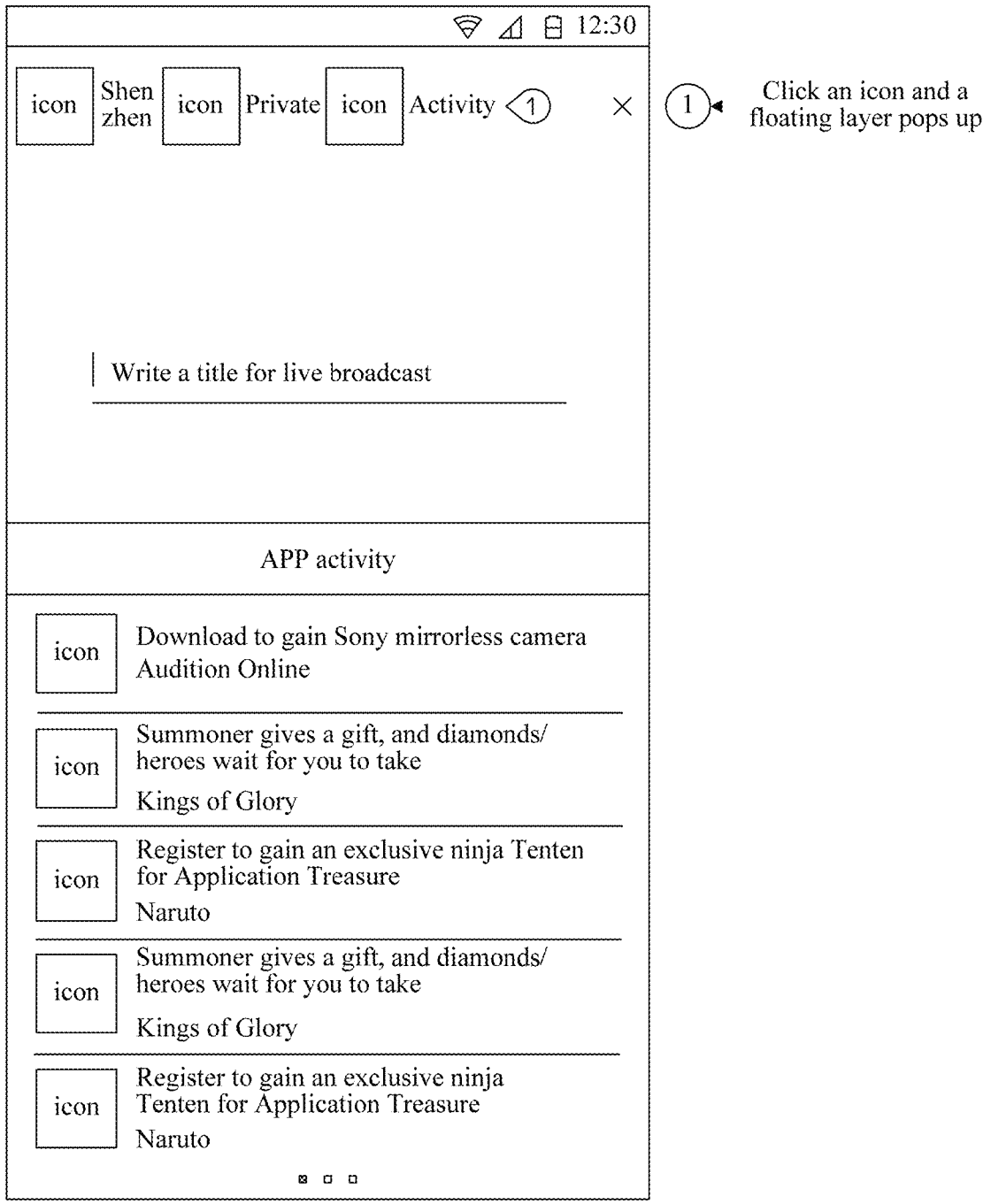
Figures 2, 8:
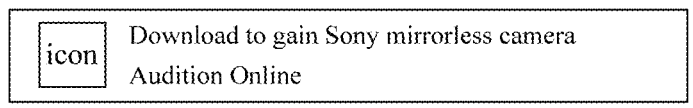
Figures 3, 8:
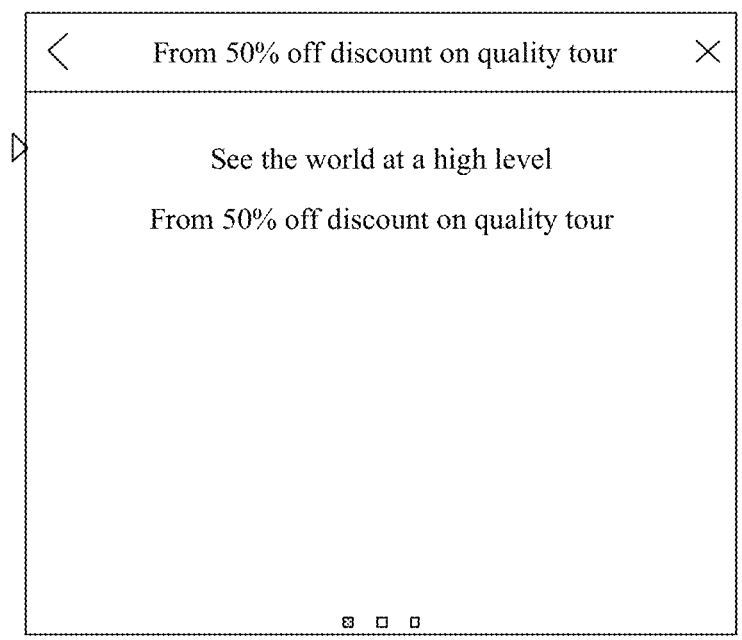
Figures 4, 8:
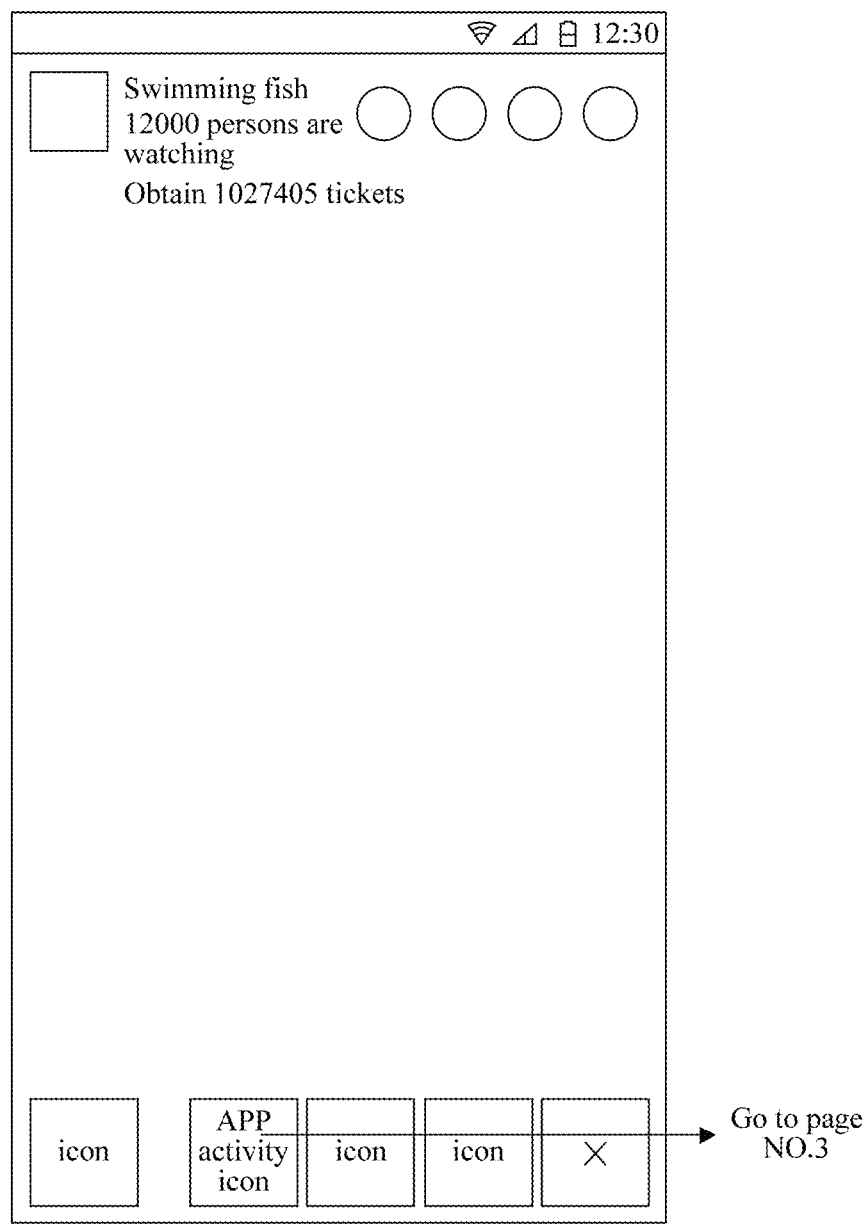
Figures 5, 8:
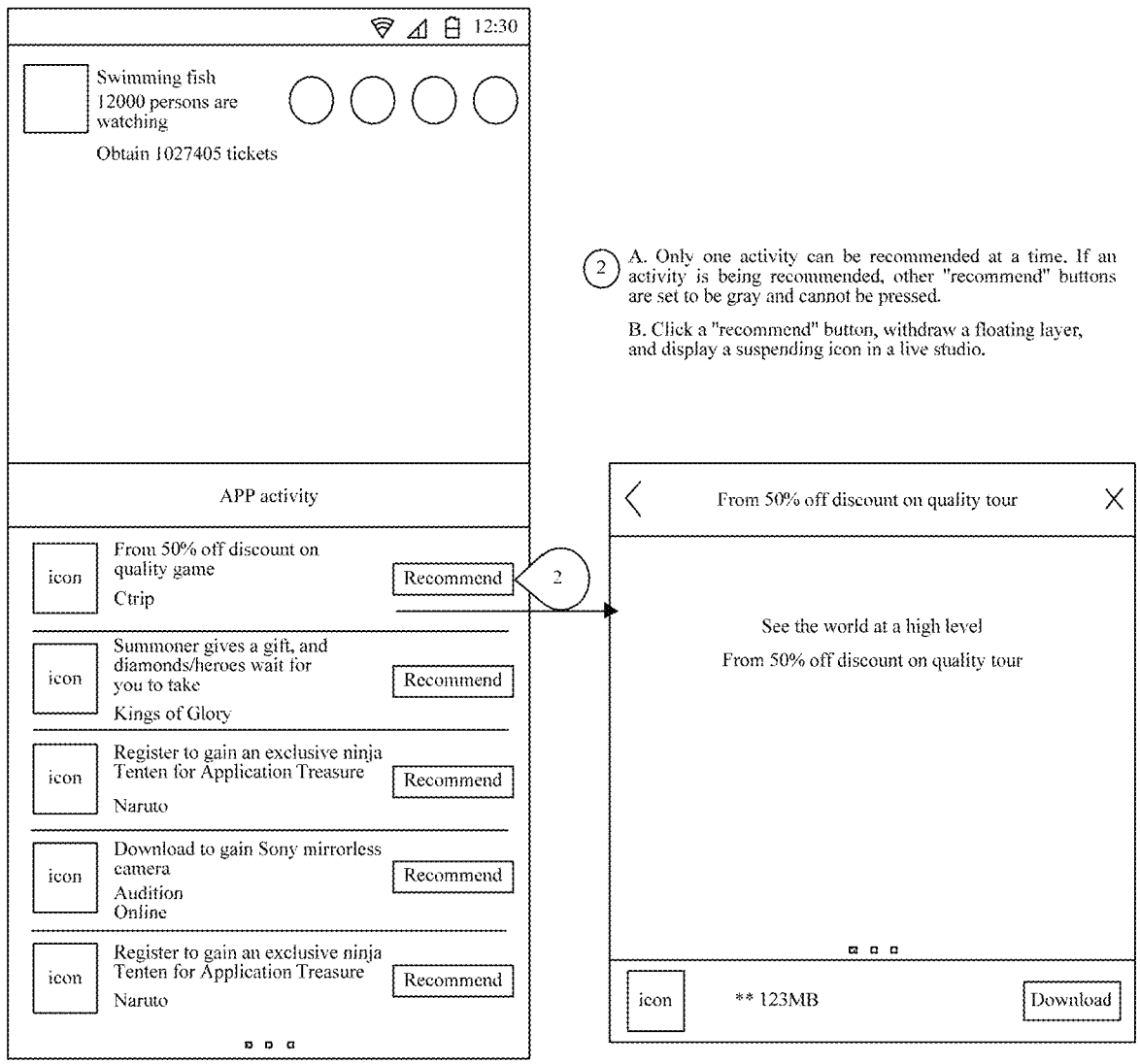
Figures 6, 8:
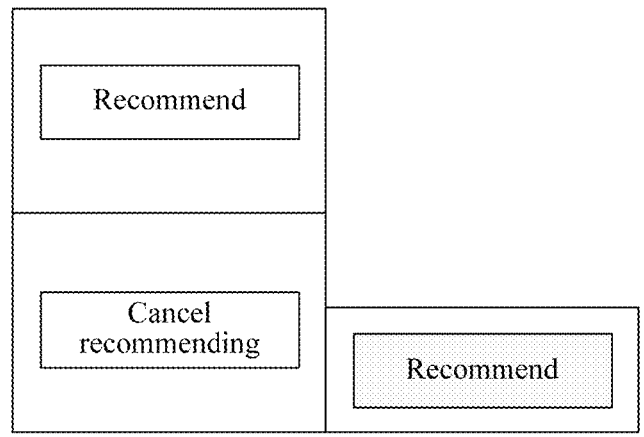
Figures 7, 8:
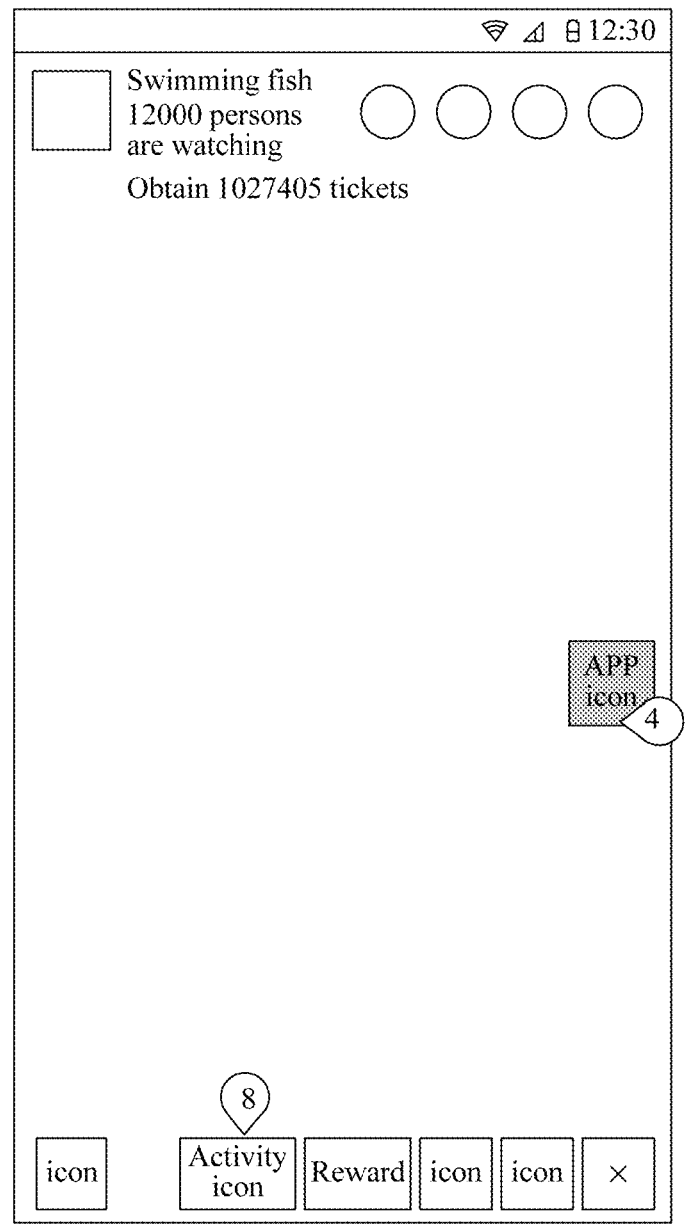
Figure 8:
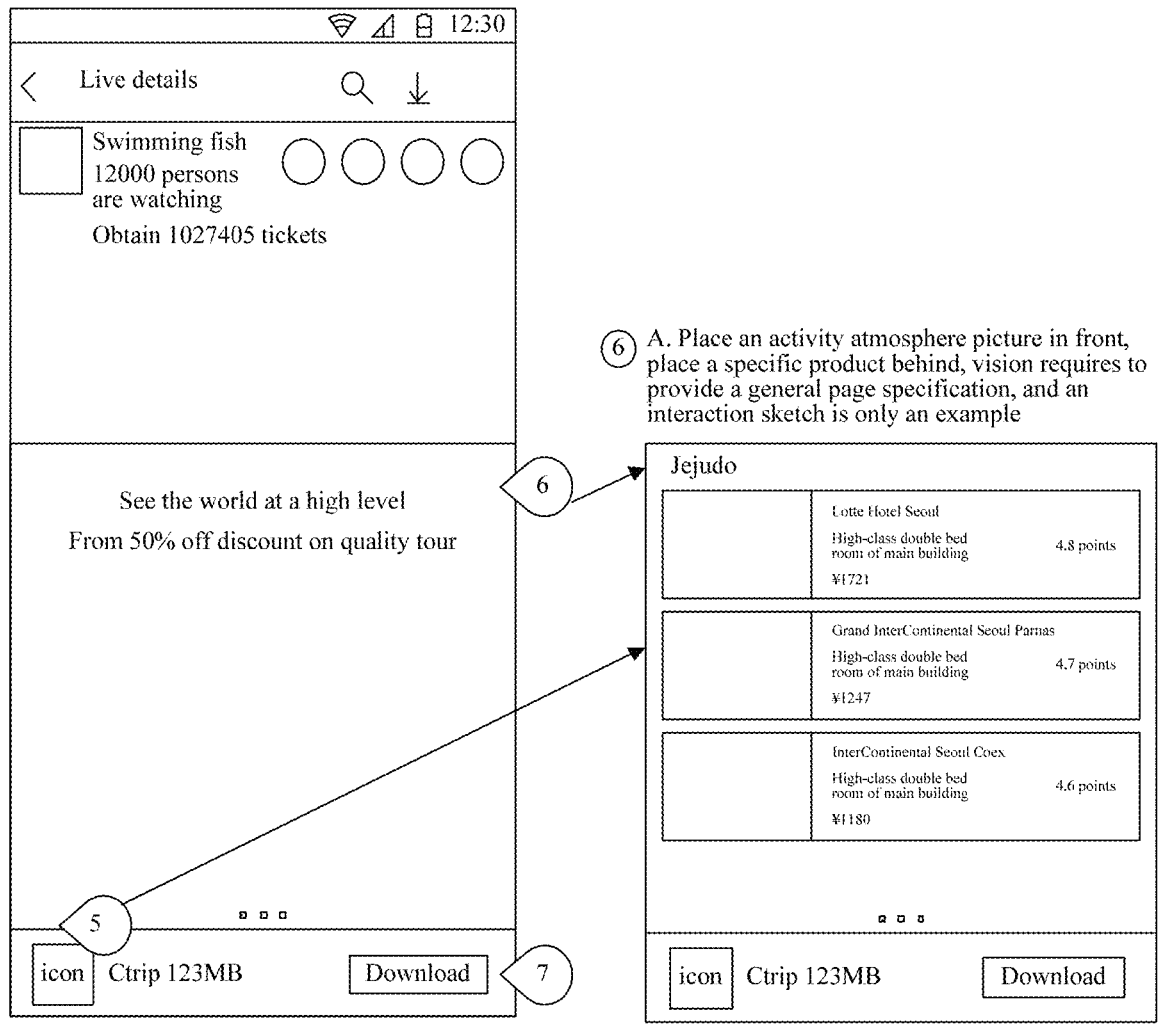
Figures 8, 9:
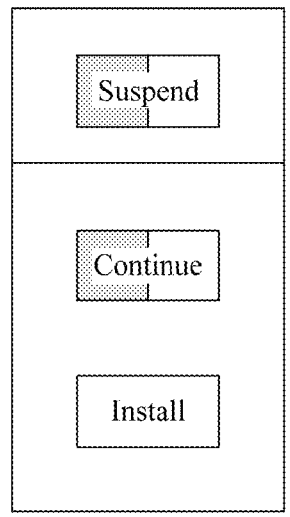
Figures 8, 9, 10:
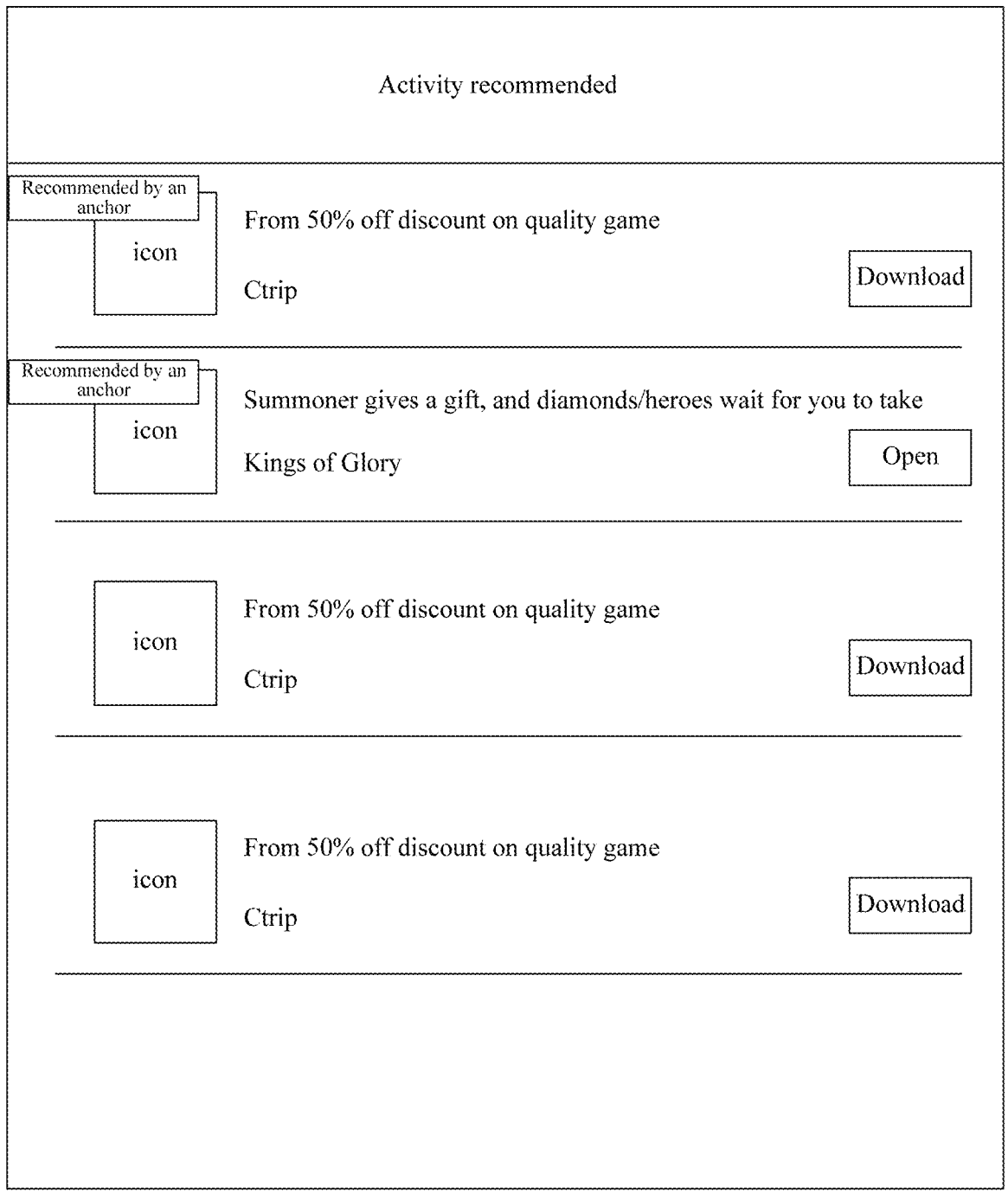
Figures 8, 9, 10, 11:
Figures 8, 9, 10, 11, 12:
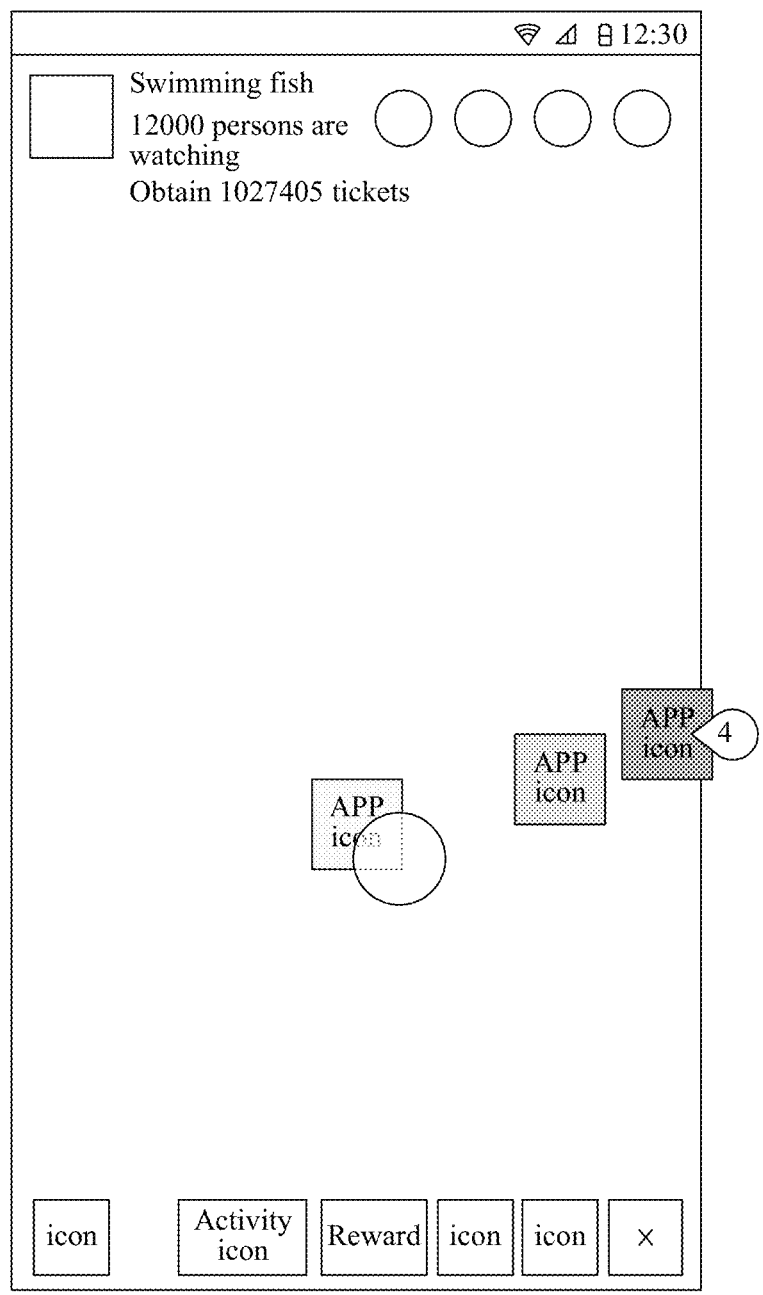
Figure 9:
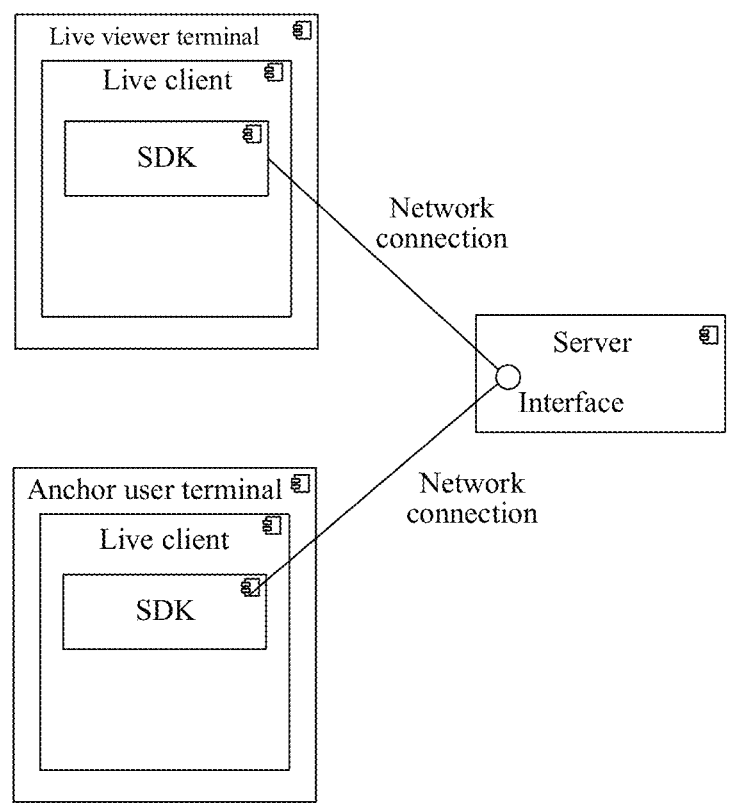
Figures 1, 10:
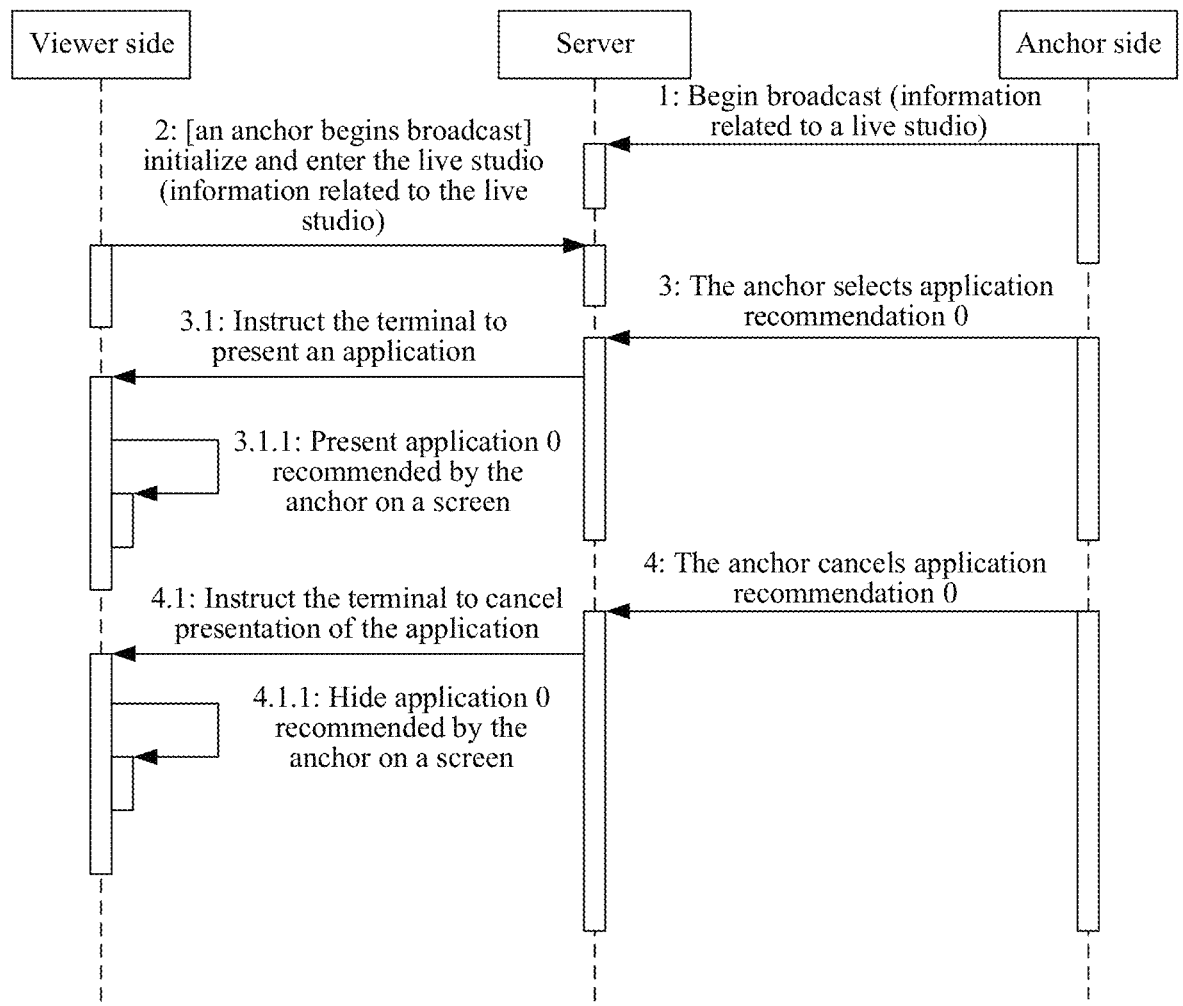
Figures 2, 10:
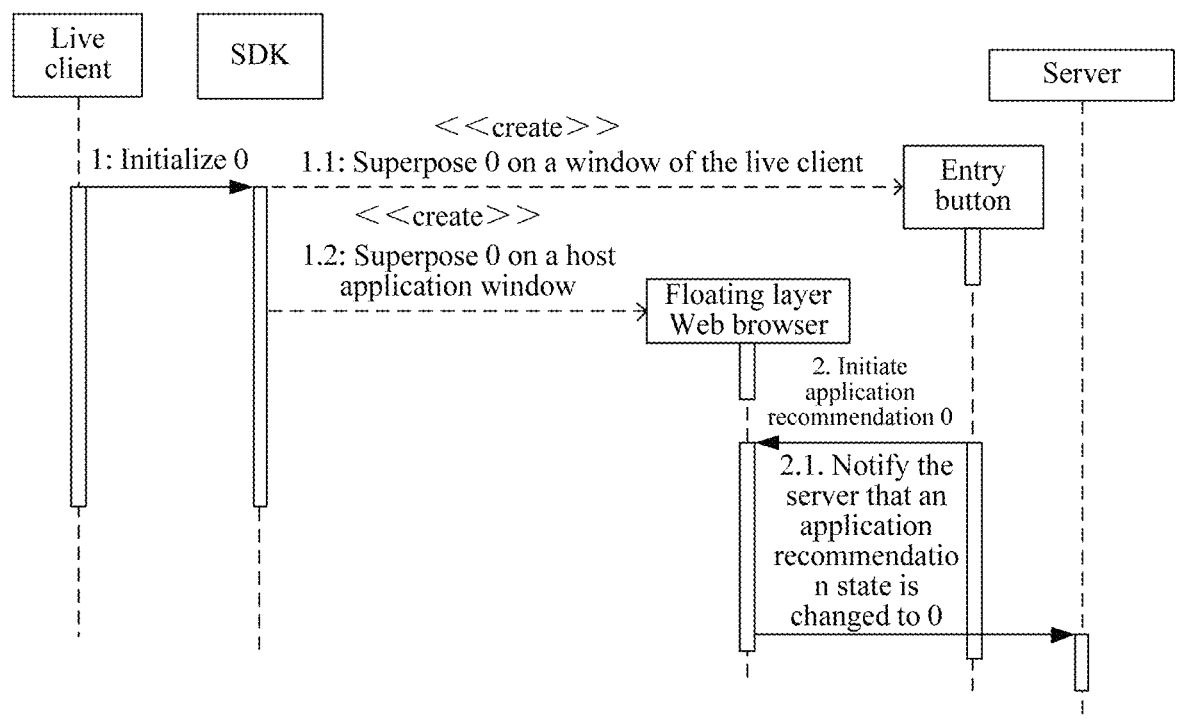
Figures 3, 10:
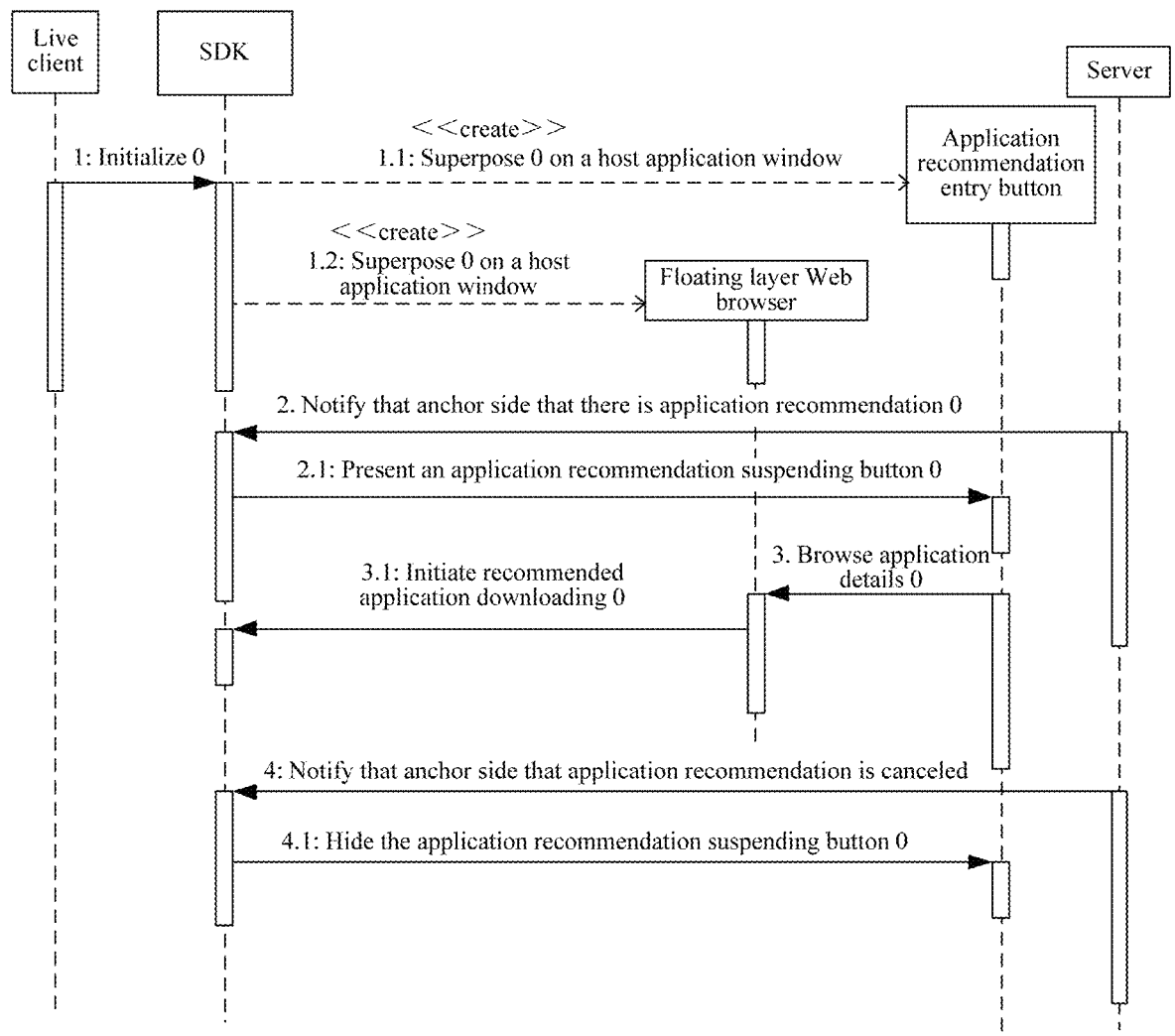

Below, with reference to a series of optional schematic displaying diagrams of pushing an advertisement in a live broadcasting service according to an embodiment of this application that are shown in FIG. 8-1 to FIG. 8-12, and schematic diagrams of an optional process of pushing an advertisement in a live broadcasting service according to an embodiment of this application that are shown in FIG. 10-1 to FIG. 10-3, an example in which an APP advertisement is pushed in a live broadcasting service of a mobile phone end is described. It should be noted that the following example is described mainly from the perspective in which a floating layer is loaded to a graphical interface of a live client and the floating layer interacts with the graphical interface. It may be understood that, according to the understanding on the foregoing description, a live window, a floating layer and a button described below may have various optional deformations, and should be not considered as a limitation on the live window, the floating layer and the button recorded above.

The following example is described with reference to graphical interfaces of an anchor user terminal and a live viewer terminal. For details not mentioned, refer to the foregoing record.

Before the live broadcasting service is initialized-the anchor user

Before the live broadcasting service is initialized, the anchor user clicks an icon ① in the live window to call out the page setting layer, loads a list of APP advertisements, and may understand APP activity content in advance, so that it is convenient for the anchor to push a corresponding application to the live viewer during live broadcast.

Referring to FIG. 8-1, an SDK (that is, the foregoing SDK) is on the live window before the anchor begins broadcast, the SDK loads the icon ①, clicks, and then directly fills out the page configuration floating layer from the bottom of the live window, including content of an APP activity, that is, a list of APP advertisements. By clicking an area before the floating layer, the anchor user may cancel the page configuration floating layer, thereby performing an operation without jumping out of the current application, to be consistent with the interaction style of the live client entire.

In the entire interface in FIG. 8-1, the content of the floating layer is content that the SDK may configure and load, and other content is coupled by the live client. Specifically, an application icon, an APP activity name, and an application name are accessed and obtained by the SDK and the server.

For an APP advertisement in the list, by clicking any area of the APP advertisement, the anchor user calls out the page details floating layer of the APP advertisement, for example, when clicking an APP advertisement that is shown in FIG. 8-2 and that is in the list in FIG. 8-1, calls out the page details floating layer shown in FIG. 8-3. Content in the page details floating layer may be a material of a picture type, a content provider provides detailed content of the APP activity, and submits and uploads the content to the server, and the SDK uniformly pulls the content from the server. The anchor may click the returning button of the page details floating layer, and return to the page setting floating layer.

In the live broadcasting service process-the anchor user

After the live broadcasting service is initialized completely, the anchor user begins live broadcast, and content of performance of the anchor user is displayed in live windows of live clients of both the anchor user and the live viewer.

Referring to FIG. 8-4, the anchor user clicks an APP activity icon of the live studio, the page setting floating layer shown in FIG. 8-5 pops up, title copywriting of each APP advertisement is uploaded by a content provider to the server, and the SDK pulls the title copywriting.

By clicking a location out of a list recommendation button, the anchor user calls out the page details floating layer to display details of the APP advertisement, the details are all provided by the content provider, and the anchor user may click the returning button on the page details floating layer to cancel the page details floating layer, and return to the page setting floating layer.

By clicking any location out of the floating layer, the anchor triggers the SDK cancellation floating layer, so that blocking of the live window is eliminated.

The anchor user pushes only one APP advertisement each time. After the anchor user clicks a recommendation button of the APP advertisement, as shown in FIG. 8-6, a status of the recommendation button of the APP advertisement becomes cancel recommendation in the page setting floating layer, and recommendation buttons of other applications are set to be gray (indicating that the other applications cannot be currently pushed). After the anchor clicks the button for canceling recommendation again, an effect of setting to be gray is canceled.

In the live broadcasting service process-the live viewer user

After the live viewer user enters the live studio, as shown in FIG. 8-7, the live window is loaded with an icon the same as that of the live window of the anchor user. After clicking an icon ④ of an APP activity, the live viewer calls out the page details floating layer shown in FIG. 8-8, to display details of an APP advertisement recently pushed by the anchor user.

Referring to FIG. 8-8, when clicking content ⑥ of an explicit advertisement or clicking an activity icon ⑤ to view an activity recommended by the anchor user today, the live viewer may call out the page details floating layer, and may download the application by clicking an icon ⑦ in an activity details page.

The page details floating layer includes information such as an APP logo and an activity name, and includes content such as a picture and a text to further comprehensively describe the APP activity, and provide a downloading button. After clicking the downloading button, the user may download the application. A material of an application details page is provided by the content provider, and pulled by the SDK.

Referring to FIG. 8-9, according to a downloading status, when the live viewer downloads an application, the downloading button is displayed in different statuses such as download, suspend, install, and open, and a status of a downloading bar is uniformly displayed on the downloading button.

Referring to FIG. 8-10, when clicking the activity icon ⑧ shown in FIG. 8-7, the live viewer calls out the page setting floating layer shown in FIG. 8-10, the terminal displays an application recently recommended by the anchor user, and the application recommended by the anchor is ranked preferably, and is specially marked (tagged). Moreover, when the anchor user pushes no APP advertisement, the page setting floating layer still displays an APP advertisement.

Moreover, a chat area window of the live client of the live viewer displays corresponding content, and fields of the content may be configured in the SDK. For example, content is "the live viewer XXX is downloading the APP XXX. If you want to be high together with the anchor, hurry up to download".

During live broadcast-activity presentation

When the anchor user pushes an APP advertisement, a suspending icon ④ shown in FIG. 8-7 is generated in the live window of the live viewer user. When the live viewer user clicks the icon ④, the page details floating layer shown in FIG. 8-8 pops up.

The icon ④ is removed in two manners:

1. The anchor user actively cancels recommendation. In this case, the suspending icon for pushing an APP advertisement is canceled in live windows of both the anchor user and the live viewer.

2. The anchor user removes the suspending icon ④ in a slide manner. In this case, the suspending icon for pushing an APP advertisement is canceled in live windows of both the anchor user and the live viewer.

As shown in FIG. 8-10 and FIG. 8-12, the icon ④ visually provides the user with a draggable visual effect. When the live viewer presses and drags the icon, as the icon ④ moves, transparency gradually decreases. There is a prompt that the icon ④ is to disappear if the live viewer looses grip, and a decrease range of the transparency of the icon ④ is 100%-20%. When the live viewer puts the icon ④ back to the original location, the icon ④ is restored to the initial opaque status, and is not deleted.

3. The live viewer user drags the icon ④ to delete the icon ④ in the live window of the live viewer, and icons ④ in live windows of the anchor user and other live viewers continue to be retained.

Moreover, when the live viewer user drags the floating icon ④ for the first time, the SDK prompts that there is a course for deleting the icon ④, to instruct the live viewer how to remove and delete the icon. After the user deletes the icon once, the removing course is not prompted again.

In actual application, the anchor user terminal and the live viewer terminal maintain the live broadcasting service by using the server, and push an APP advertisement to the live viewer by using the server. Specifically, the terminals are intelligent terminal devices on which an application accessing the SDK is run, and access the Internet in a manner such as by using a mobile data network or a WLAN, the SDK and the live client perform data communication by using network connections of the terminals and a service interface (a service interface used to push an advertisement) of the server, and the live client accesses the SDK and has a capability of recommending an APP advertisement.

With reference to FIG. 9, FIG. 10-1 to FIG. 10-3, a process in which the SDK on the anchor side, the server, and the SDK on the live viewer side push an APP advertisement is described.

Referring to FIG. 10-1, the anchor user side and the live viewer side perform communication and synchronize data by using the server, the anchor user begins broadcast and uploads, to the server, information related to the live studio this time (for example, an anchor ID, or a live studio ID), and the live viewer joins the live studio to watch live broadcast.

When the anchor user selects, by using the capability provided by the SDK, an APP advertisement to be pushed to the live viewer, the SDK reads related advertisement data from the server, and notifies the spectator of the related advertisement data by using the server. The server notifies all live viewers that the anchor user pushes an APP advertisement, and the SDK on the live viewer side presents the pushed APP advertisement in the live window.

When needing to cancel APP push, the anchor user cancels, by using the capability provided by the SDK, presentation of the corresponding APP advertisement on the live viewer side, and the SDK uploads data related to the server (cancel the presented APP advertisement). The server notifies all live viewers that application recommendation is canceled, and the SDK hides the recommended APP advertisement on the screen of the terminal device.

Then referring to FIG. 10-2, the SDK on the anchor user side obtains, by using the live client, an environment and a resource needed during running and presents related content, the live client completes initialization of the SDK on the anchor user side by using an initialization method provided by the SDK on the anchor user side, and the SDK on the anchor user side superposes two components, namely, an application recommendation entry button and a Web browser on the live client window.

The anchor user actively clicks the application recommendation entry button to initiate application recommendation, and the Web browser is loaded to a related page, to complete operations of application details viewing and application recommendation.

Referring to FIG. 10-3, the SDK on the live viewer side obtains, by using the live client, an environment and a resource needed during running and presents related content, the live client completes initialization of the SDK on the live viewer side by using an initialization method provided by the SDK on the live viewer side, and the SDK on the live viewer side superposes two components, namely, an application recommendation entry button and a Web browser on the live window of the live client. When the live viewer watches live broadcast, if the anchor recommends an application, the SDK on the live viewer side receives, from the server, a notification of recommending an application, the SDK on the live viewer side presents the application recommendation entry button, and clicks to open operations capable of browsing details of the recommended application and downloading recommended application. When the live viewer watches live broadcast, if the anchor closes the recommended application, the SDK on the live viewer side receives, from the server, a notification of closing application recommendation, and the SDK on the live viewer side hides the application recommendation entry button.

To sum up the foregoing examples, when the embodiments of this application are applied to a scenario of pushing an advertisement in a live broadcasting service, there are at least the following beneficial effects:

1) After clicking, a live viewer may understand advertisement content, and select whether to download the advertisement content, to shorten a path for reaching the live viewer, and there is more image and text content to be provided to the live viewer, so that presentation content is richer, and a conversion effect is better.

2) On an anchor end configuration page, an anchor may efficiently change content recommended to the live viewer, and the anchor may very conveniently understand details of content recommended by the anchor. This is very simple and convenient.

3) Content is recommended based on an application library of the entire application treasure, and applications and games on the market are massive, to satisfy anchors of various different live content. Additionally, the SDK may be expanded to aspects such as e-commerce and content and is not limited to application distribution, and content is very rich.

4) Data is reported by using the SDK, and specific data of each step may be accurately obtained. By using data, precision of recommendation such as targeted recommendation may be further optimized, and an entire conversion rate is improved in a manner such as using intelligent algorithm recommendation.

5) A user at a mobile phone end may also conveniently click an advertisement, to resolve a problem that recommendation of an anchor at the mobile phone end cannot reach the user.

A person skilled in the art may understand that, some or all of steps for implementing the method embodiments may be implemented by using hardware related to a program instruction. The program may be stored in a computer readable storage medium. When the program is executed, the steps including the method embodiments are performed. However, the storage medium includes various types of media that may store program code, for example, a mobile storage apparatus, a random access memory (RAM), a read-only memory (ROM), a magnetic disk, or an optical disk.

Alternatively, when the integrated unit of this application is implemented in a form of a software functional module or a software unit and sold or used as an independent product, the integrated unit may be stored in a computer-readable storage medium. Based on such an understanding, the technical solutions of the embodiments of this application essentially, or the part contributing to the related technology may be implemented in a form of a software product. The computer software product is stored in a storage medium and includes several instructions for instructing a computer apparatus (which may be a personal computer, a server, a network apparatus, or the like) to perform all or some of the methods described in the embodiments of this application. The foregoing storage medium includes: any media that can store program code, such as a removable storage apparatus, a RAM, a ROM, a magnetic disk, or an optical disc.

Correspondingly, an embodiment of the present disclosure further provides a computer storage medium storing a computer executable instruction, and when being executed by a processor, the computer executable instruction implements the foregoing information processing method of the embodiments the present disclosure.

The foregoing descriptions are merely specific embodiments of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the appended claims.

INDUSTRIAL PRACTICABILITY

In the technical solution of the embodiments of the present disclosure, when media information is pushed to a live viewer in a live broadcasting service, a live video stream and the media information are independently sent to the live viewer. The transmission of the live video stream and transmission of the media information do not affect each other; and the live video stream is played in a live window on a live viewer side. The media information is presented in an area established based on the live window. The media information and the live video stream are presented by using different mechanisms, to implement decoupling of the media information and the live video stream in transmission and presentation aspects. As such, when the pushed media information needs to be switched, recoding processing on the live video stream is not involved, thereby saving resource overhead. Moreover, by configuring, in the area, a list of media information that can be pushed to the live viewer and that is presented to an anchor user, the anchor user may be supported in selecting acquainted/preferred media information to be pushed to the live viewer in a live process, to fuse content of the live broadcasting service and the media information, so that the pushed media information is accepted by the live viewer more easily, and for an advertisement, conversion of an advertisement effect (for example, click, purchase and information retention of the live viewer) can be urged.

What is claimed is:

1. An information processing method applied to a computing terminal, comprising:
    initializing a live broadcasting service between an anchor user and a live viewer;
    collecting media data;
    encoding the collected media data to form a live video stream, and sending the live video stream to a live window of the live viewer;
    setting a media information push area based on a live window of the anchor user;
    loading to the media information push area, candidate media information to be pushed to the live viewer;
    determining to-be-pushed media information selected by the anchor user; and
    sending the to-be-pushed media information to a media information push area of the live viewer to be displayed.

2. The method according to claim 1, further comprising at least one of:
    querying a server for the candidate media information conforming to a characteristic of the anchor user; and
    querying the server to obtain the candidate media information conforming to a characteristic of the live viewer.

3. The method according to claim 1, wherein loading the candidate media information to be pushed to the live viewer, and determining to-be-pushed media information selected by the anchor user comprises:
    establishing, after the live broadcasting service is initialized, a page setting area on the live window of the anchor user, loading a list of the candidate media information to the page setting area, and determining a candidate media information set by the anchor user in the page setting area as the to-be-pushed media information.

4. The method according to claim 3, wherein establishing a page setting area on the live window of the anchor user comprises:
    establishing the page setting area on the live window of the anchor user when receiving a trigger operation for a first button in the live window of the anchor user.

5. The method according to claim 1, further comprising:
    establishing a corresponding page details area when a viewing operation for target media information is received in a page setting area, and loading a material forming the target media information to the page details area; and
    canceling the page details area of the target media information when receiving a viewing cancellation operation for the target media information in the page setting area.

6. The method according to claim 1, wherein loading the candidate media information to be pushed to the live viewer, and determining to-be-pushed media information selected by the anchor user comprises:
    establishing a page configuration area on the live window of the anchor user before the live broadcasting service is initialized, and loading a list comprising the candidate media information to be pushed to the live viewer to the page configuration area.

7. The method according to claim 6, further comprising:
    loading, before the establishing the page configuration area on the live window of the anchor user, a second button to the live window, and receiving a trigger operation for the second button.

8. The method according to claim 6, further comprising:
    determining, based on the list comprising the candidate media information to be pushed to the live viewer loaded to the page configuration area, the to-be-pushed media information that is set by the anchor user in the page configuration area.

9. The method according to claim 1, wherein sending the to-be-pushed media information to an area of the live window of the live viewer to be displayed comprises:
    sending, after the live broadcasting service is initialized, the to-be-pushed media information that is set by the anchor user before the live broadcasting service is initialized to the area of the live window of the live viewer to be displayed.

10. The method according to claim 9, further comprising:
    establishing a page details area based on a browser component when receiving a viewing operation for target media data in a page configuration area, and loading a material forming the target media data to the page details area; and
    canceling the page details area of the target media data when receiving a viewing cancellation operation for the target media data in the page configuration area.

11. The method according to claim 1, further comprising:
    instructing, when an operation for the anchor user to stop pushing the media information is received, the live viewer to stop presenting the media information in the corresponding live window.

12. The method according to claim 1, further comprising:
    reporting, to a server, a record of the media information pushed by the anchor user, wherein the record is used by the server to determine push effect data of the pushed media information with reference to a record of received media information reported by the live viewer, to determine a characteristic of the anchor user, and to push, based on the characteristic, candidate media information conforming to the characteristic of the anchor user.

13. The method according to claim 1, wherein the setting a media information push area based on a live window of the anchor user comprises:
    establishing a media information push window in a manner of avoiding the live window or partially blocking the live window; or establishing a media information push floating layer in a manner of avoiding the live window or partially blocking the live window.

14. An information processing system, comprising:
an anchor user terminal, initializing a live broadcasting service between an anchor user and a live viewer with a live viewer terminal; collecting media data, encoding the collected media data to form a live video stream, and sending the live video stream to a live window of the live viewer to perform a playback;

the anchor user terminal establishing a media information push area based on a live window of the anchor user; loading, to the media information push area, candidate media information to be pushed to the live viewer, and determining to-be-pushed media information selected by the anchor user; and sending the to-be-pushed media information to the live viewer terminal; and the live viewer terminal, establishing a media information push area based on the live window of the live viewer, receiving the to-be-pushed media information, and loading the received media information to the established media information push area to be displayed.

15. The system according to claim 14, wherein establishing a media information push area based on a live window of the live viewer, and loading candidate media information to the media information push area comprises:
establishing a page details area on the live window of the live viewer when the media information sent by the anchor user is received, loading a material comprised in the received media information to the page details area to be displayed; and stopping, when a removing operation for a third button is received, loading the third button.

16. The system according to claim 15, wherein the live viewer terminal is further configured to perform:
loading, before the establishing the page details area on the live window of the live viewer, the third button to the live window of the live viewer, and receiving a trigger operation for the third button.

17. The system according to claim 14, wherein the live viewer terminal is further configured to perform:
loading a second button to the live window of the live viewer; and establishing a page setting area when a trigger operation for the second button is received, and loading a media information list to the page setting area, wherein the media information list comprises historical media information sent by the anchor user and media information pushed by a server.

18. The system according to claim 17, wherein the live viewer terminal is further configured to perform:
establishing a page details area when an operation for target media information in the list is received in the page setting area, and loading a material comprised in the target media information to the page details area to be displayed; and canceling the page details area of the target media information when receiving a viewing cancellation operation for the information in the page configuration area.

19. The system according to claim 15, wherein the live viewer terminal is further configured to perform:
downloading, when the material loaded to the page details area comprises a download link, data of the corresponding download link according to an operation of the live viewer; and loading, when the material loaded to the page details area comprises a landing page link, a page of a corresponding landing page to the page details area according to an operation of the anchor user.

20. A non-transitory computer-readable storage medium storing computer program instructions executable by at least one processor to perform:
initializing a live broadcasting service between an anchor user and a live viewer;

collecting media data;

encoding the collected media data to form a live video stream, and sending the live video stream to a live window of the live viewer;

setting a media information push area based on a live window of the anchor user;

loading to the media information push area, candidate media information to be pushed to the live viewer;

determining to-be-pushed media information selected by the anchor user; and sending the to-be-pushed media information to a media information push area of the live viewer to be displayed.

* * * * *